Fig. 2.

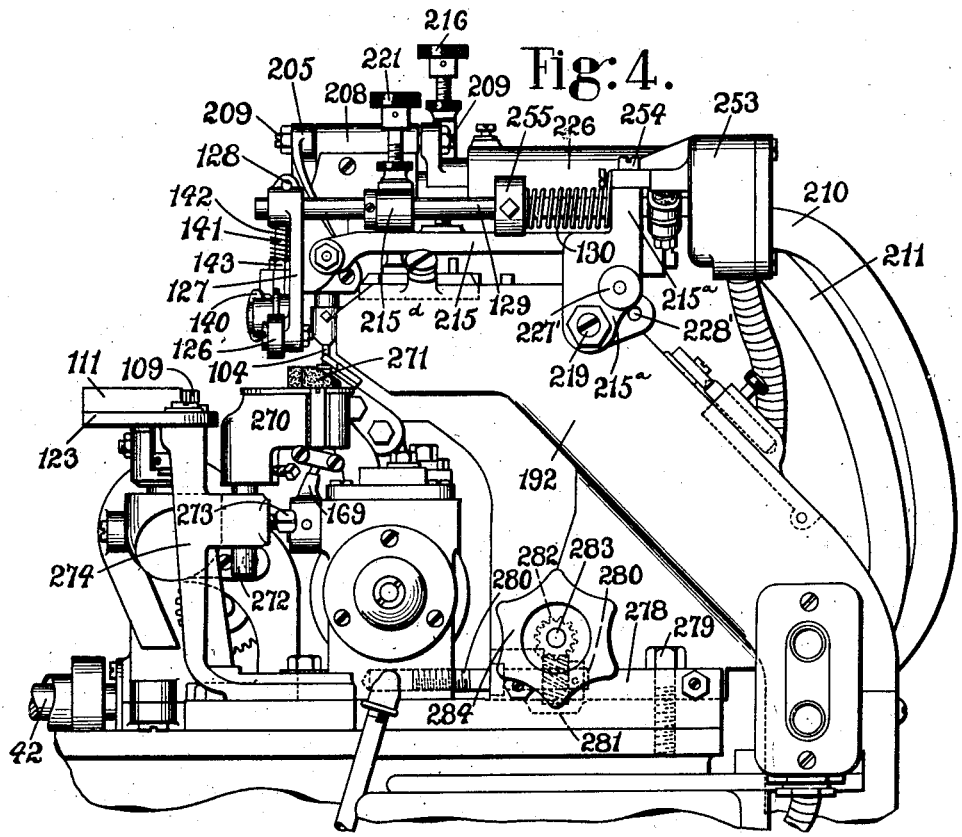
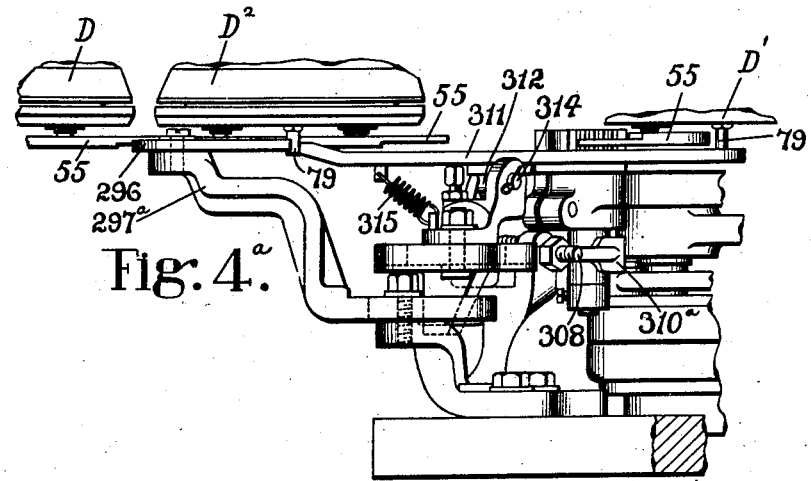

Feb. 5, 1935. J. B. COFFEY 1,989,682
APPARATUS FOR OPERATING UPON SHOE PARTS
Filed June 6, 1932 14 Sheets-Sheet 5

INVENTOR-
John B. Coffey
By his Attorney
Harlow M. Davis

Feb. 5, 1935.  J. B. COFFEY  1,989,682
APPARATUS FOR OPERATING UPON SHOE PARTS
Filed June 6, 1932   14 Sheets-Sheet 6
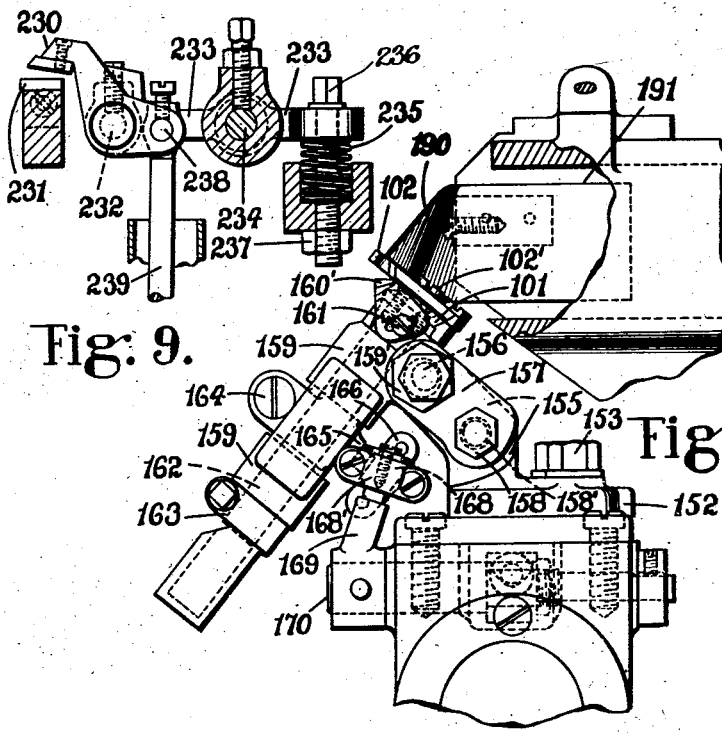
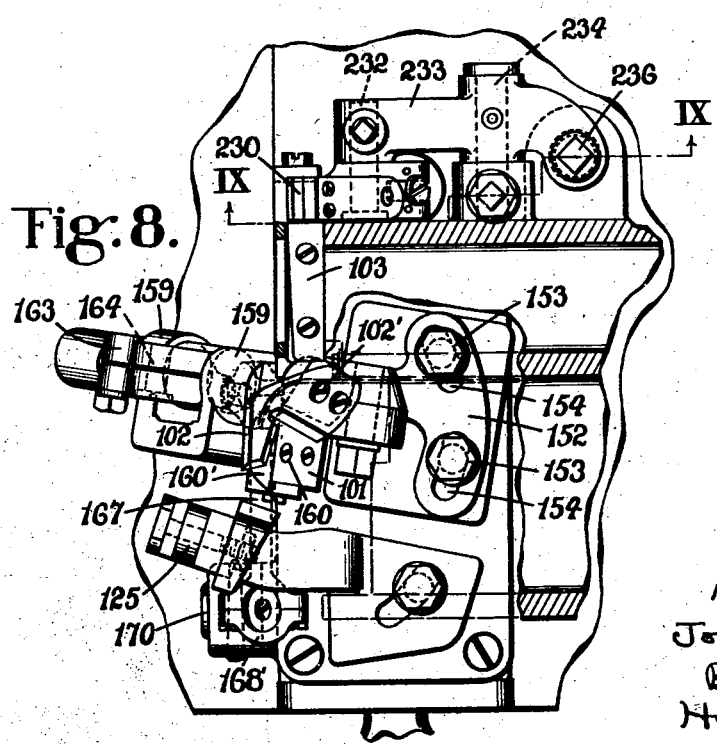
INVENTOR
John B. Coffey
By his Attorney
Harlow M. Davis

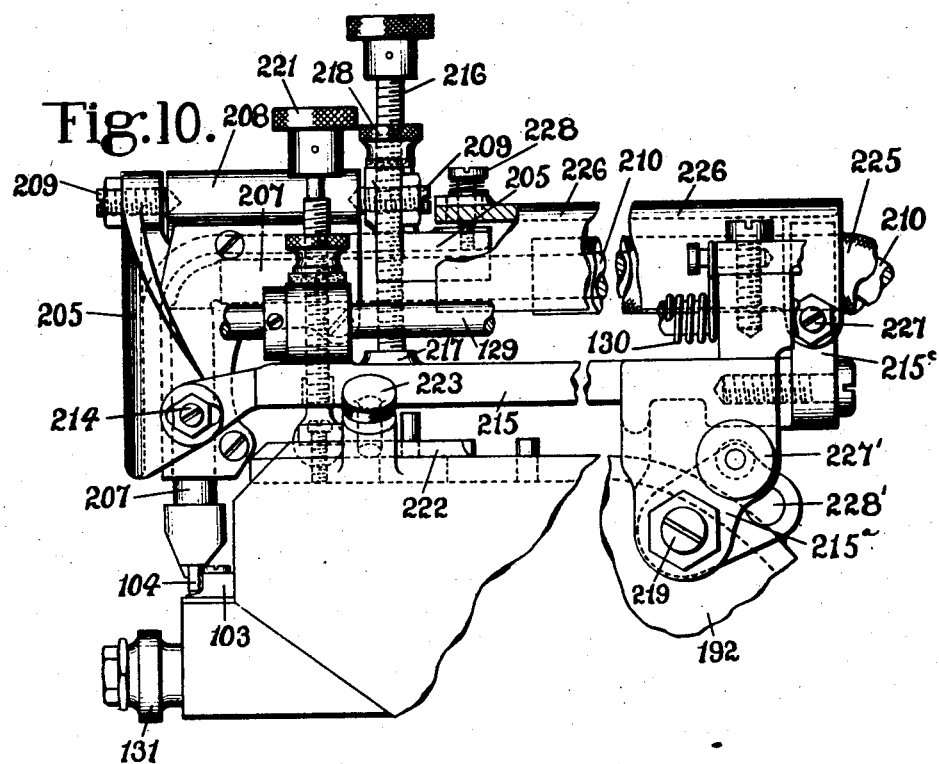
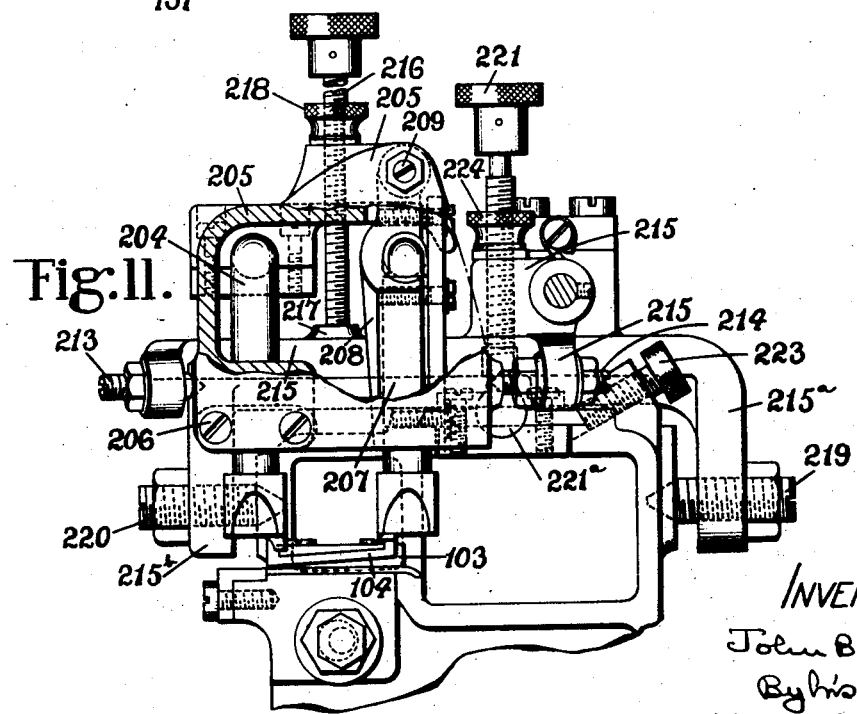

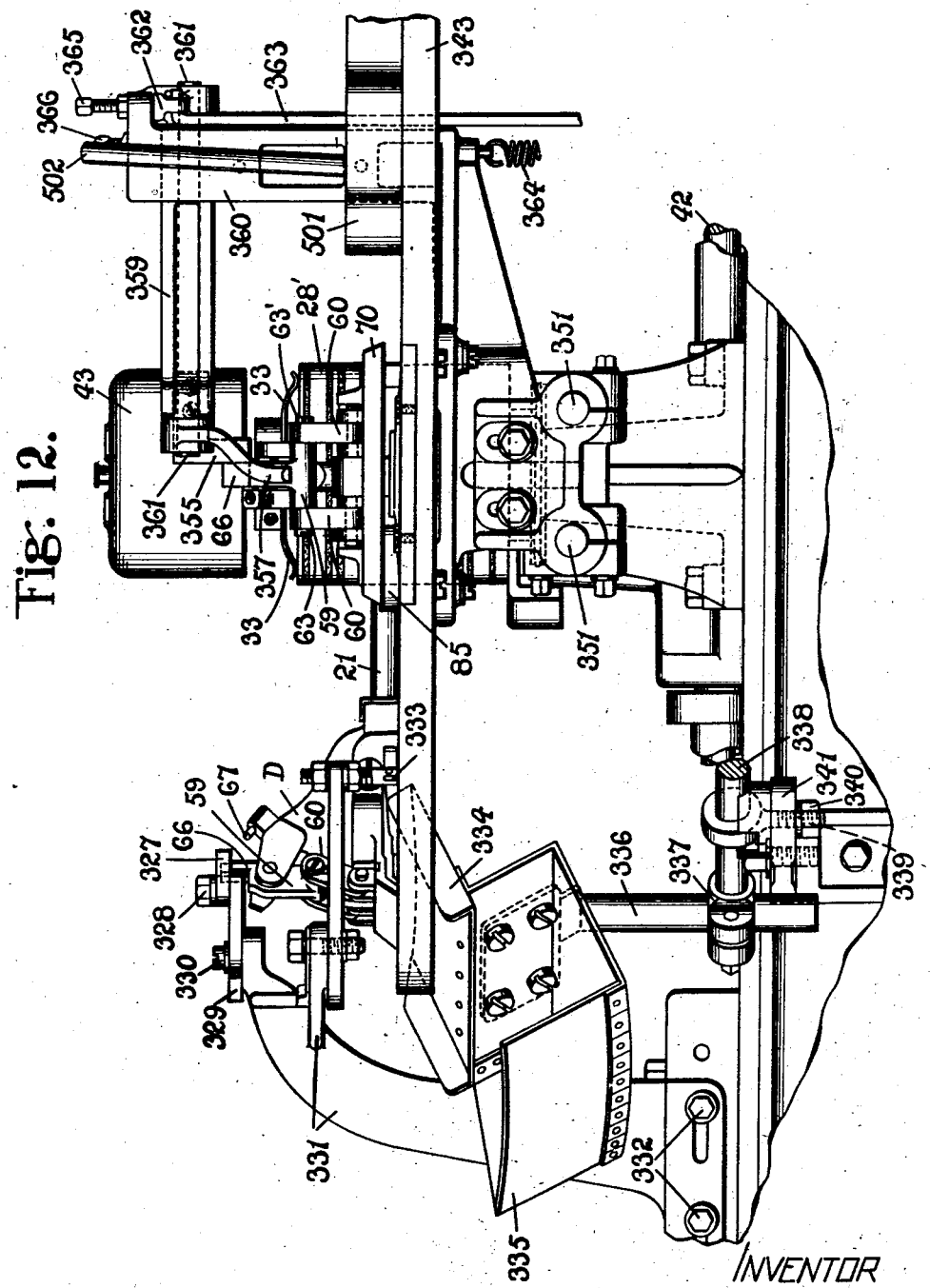

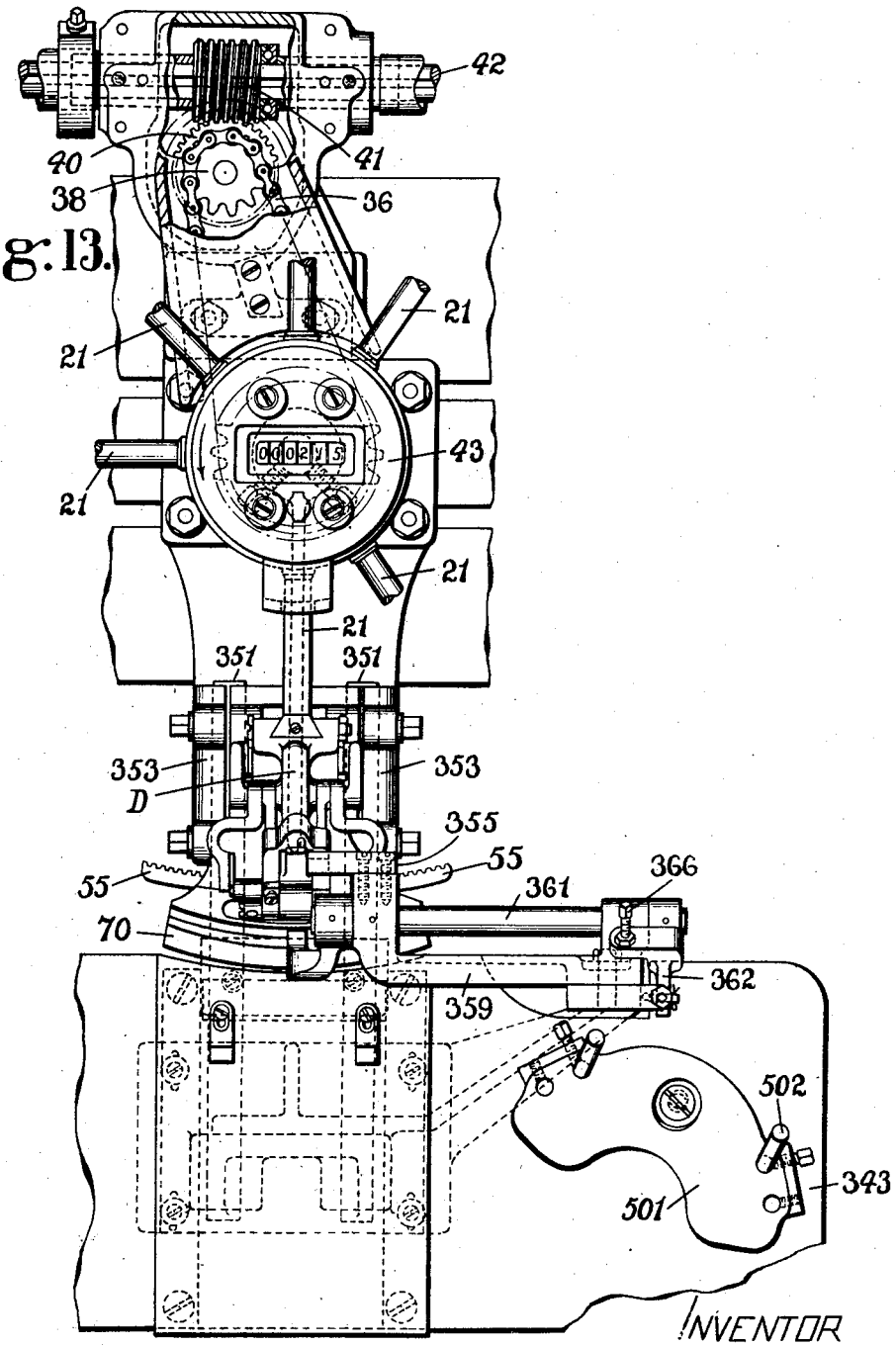

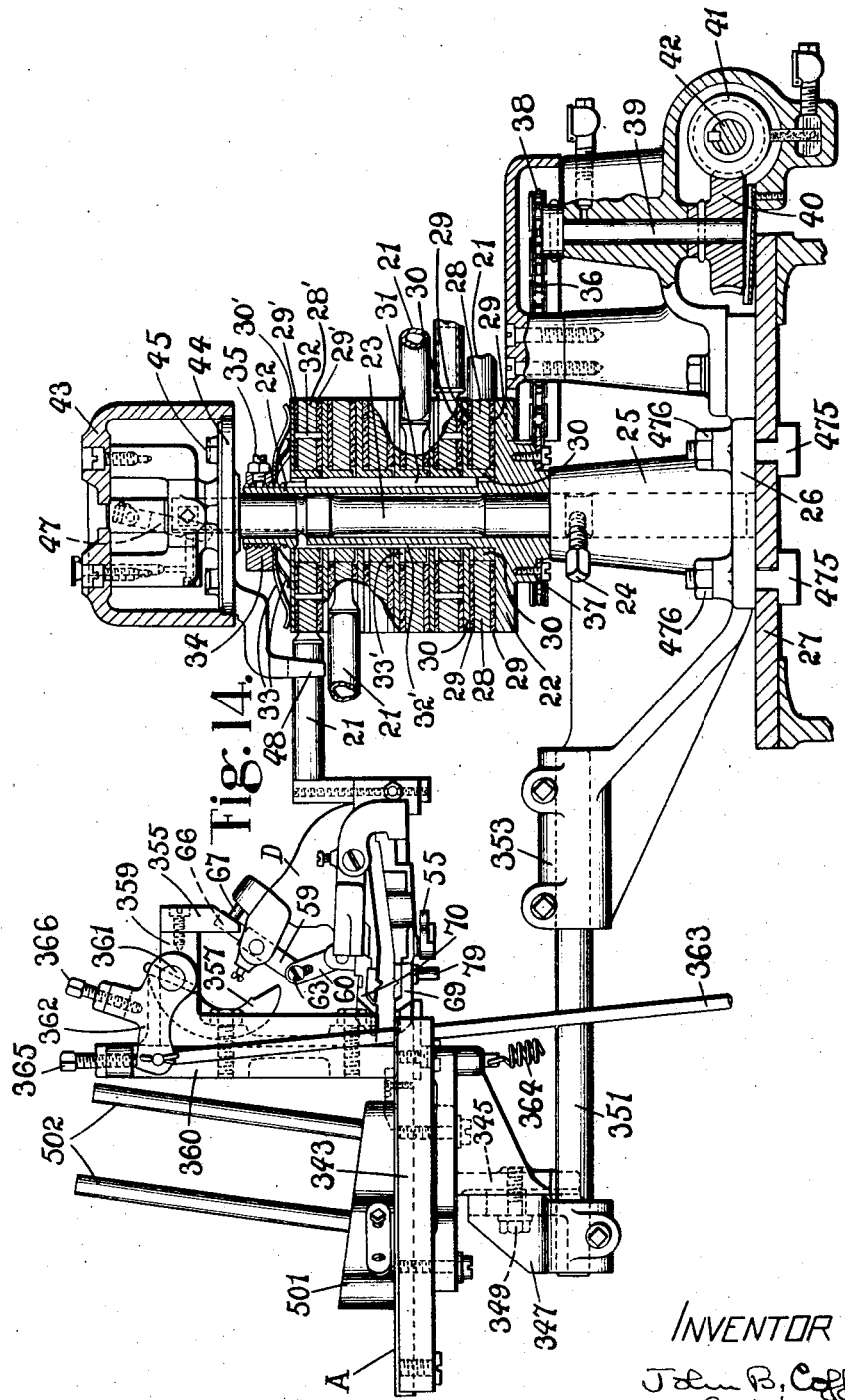

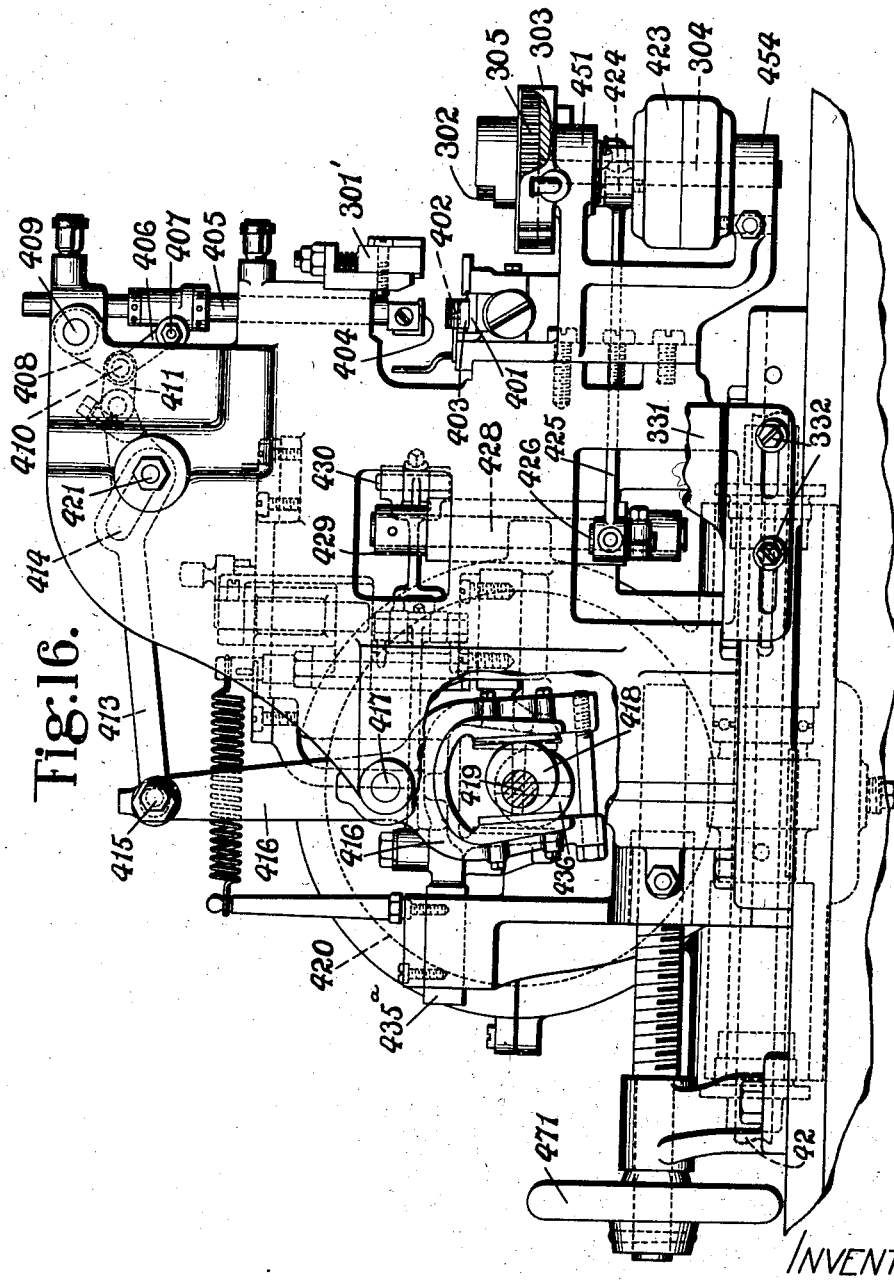

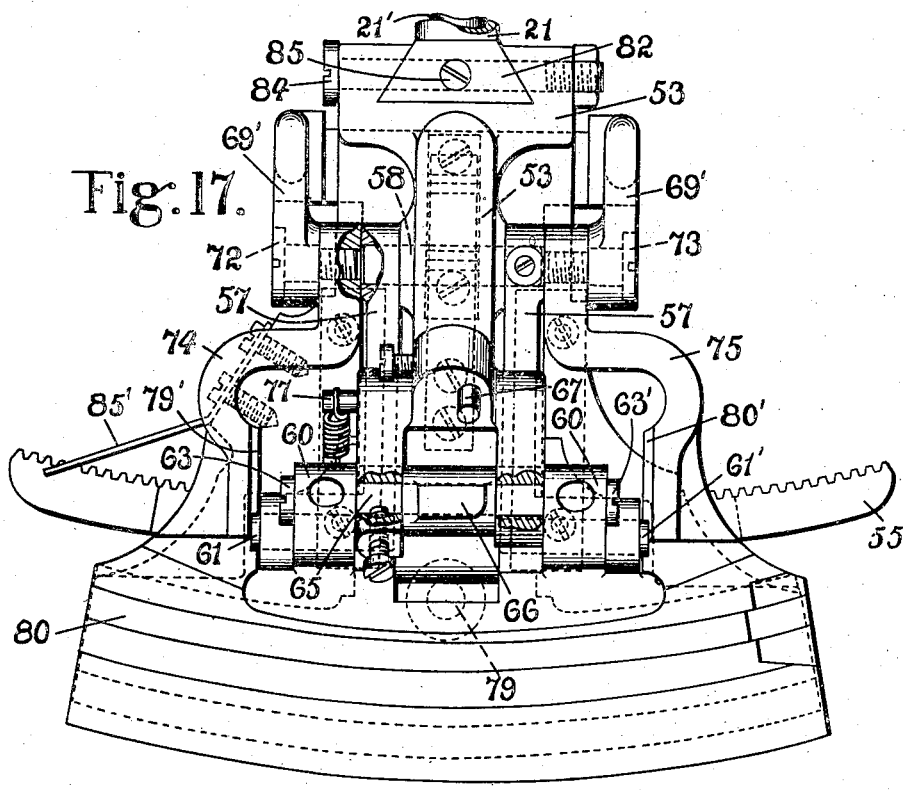
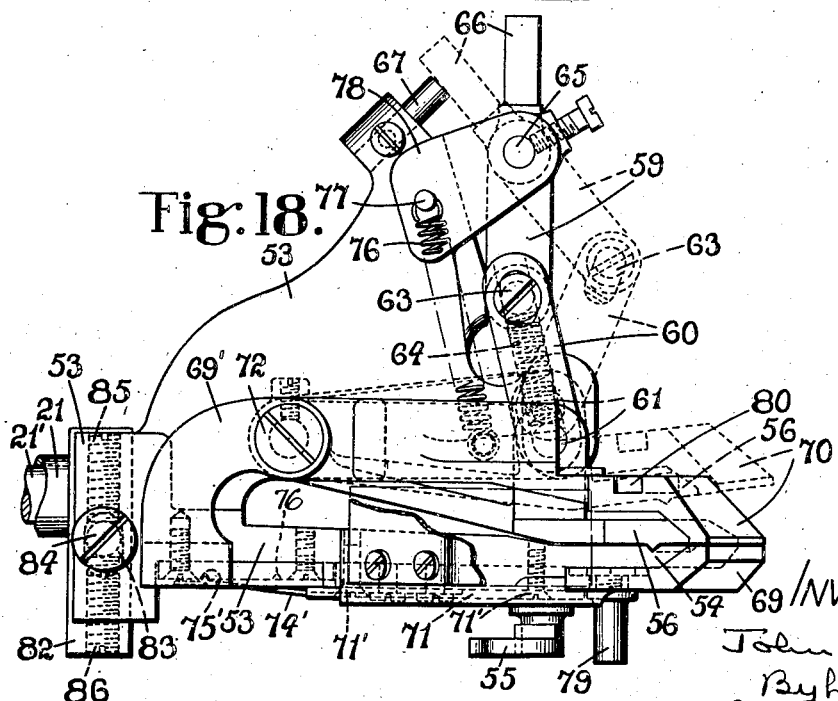

Feb. 5, 1935.　　　　J. B. COFFEY　　　　1,989,682
APPARATUS FOR OPERATING UPON SHOE PARTS
Filed June 6, 1932　　14 Sheets-Sheet 14
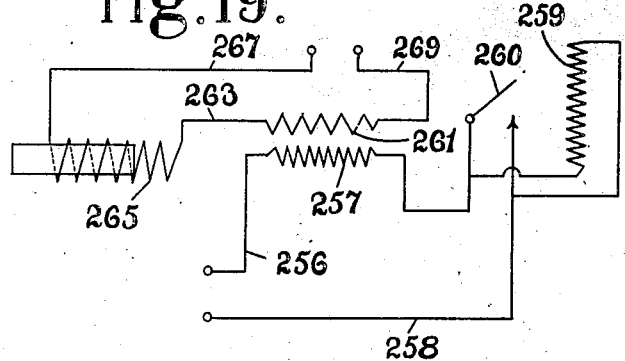
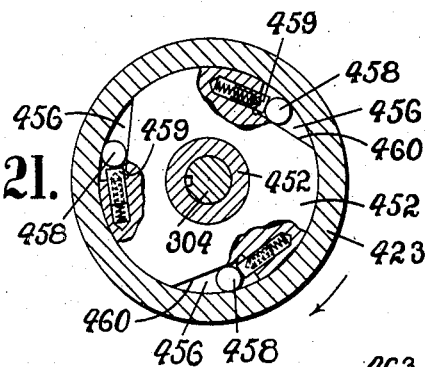
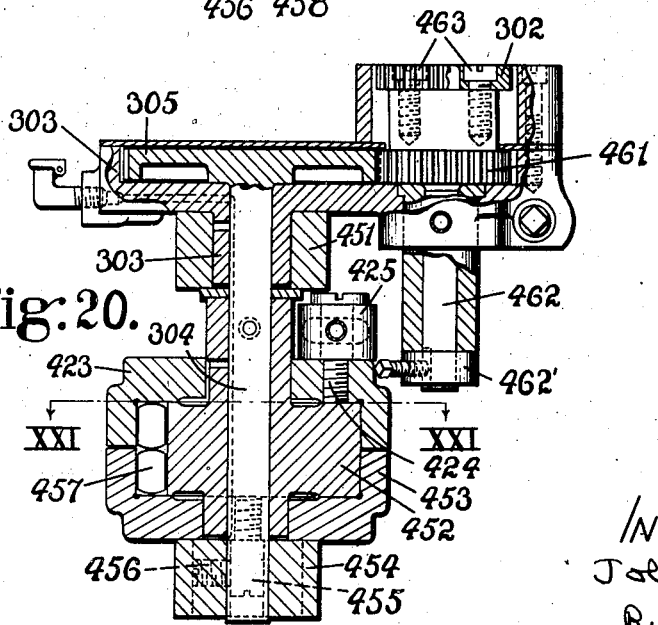

Patented Feb. 5, 1935　　　　　　　　　　　　　　　　　　1,989,682

UNITED STATES PATENT OFFICE 1,989,682

APPARATUS FOR OPERATING UPON SHOE PARTS

John B. Coffey, Boston, Mass., assignor to United Shoe Machinery Corporation, Paterson, N. J., a corporation of New Jersey Application June 6, 1932, Serial No. 615,502

51 Claims. (Cl. 12—51)

This invention relates to an apparatus for operating upon shoe parts and is herein illustrated as embodied in an apparatus of the general type shown in United States Letters Patent No. 1,754,-464, granted April 15, 1930, upon an application filed in the name of Joseph Fossa and in application Serial No. 452,391, filed May 14, 1930, in the name of Joseph Fossa for finishing the rear edges of toe tips of boots and shoes and punching a row of ornamental holes along the rear edge of each tip.

In an apparatus of this general type there is provided mechanism for skiving the edge of a toe tip, mechanism for shrinking one side (usually the flesh side) of the tip along the rear edge thereof to cause the unshrunken side to curl toward the shrunken side so that the finished edge presents a surface which is all grain, and mechanism for punching an ornamental row of holes along the finished edge. A plurality of carriers comprising clamps are successively supplied with toe tip blanks at a loading station; and these carriers are then moved in a closed path such that the blanks are presented successively to the skiving, shrinking and punching mechanisms, each carrier finally coming to rest temporarily at the loading station to receive a new toe tip blank.

In the machine of the application the carriers are moved in a circular path, the skiving and shrinking mechanisms being located close together at one station on said path, and the punching mechanism being located at a station substantially diametrically opposite. The carriers are moved from the loading station to the skiving and shrinking mechanisms by a driving means which for convenience will be termed the main driving means. They are there successively engaged by feeding means associated with the skiving and shrinking mechanisms and fed past said mechanisms. After the completion of the skiving and shrinking operations, the main driving means moves them to the punching mechanism. Here again a feeding means associated with that mechanism engages them to feed them past the punching mechanism, and then releases them once more to the main driving means which moves them back to the loading station. Thus the control of the movements of the carriers shifts back and forth between the main driving means and the feeding means which are associated with the operating mechanisms.

According to one feature of the present invention the main driving means is impositive and as shown takes the form of friction means for driving the carriers independently of one another.

In the illustrated machine the carriers are fast to the outer ends of arms the inner ends of which are fast to hubs rotatably mounted upon an upright rotating shaft, each hub being engaged frictionally by driving members which rotate with the shaft. With such a construction it is possible to retard or to arrest the movement of any selected carrier without affecting the movement of the remaining carriers and without disconnecting the selected carrier from its driving means. With this construction a carrier may, for example, be moved quickly to the skiving and shrinking mechanisms, more slowly past said mechanisms, again quickly to the punching mechanism, more slowly past said mechanism, quickly to the loading station and there brought to rest, all without at any time disconnecting the carrier from its main driving means.

In order to simplify the work of the operator, there is provided in accordance with another feature of the invention means for removing the finished tips from the carriers and for bringing the empty carriers to rest at the loading station with their parts in position to receive another toe tip blank. In the illustrated construction, each carrier comprises a clamp having jaws which are closed upon a toe tip until the carrier has passed the punching mechanism. After the carrier passes this mechanism, the clamp is opened, the finished toe tip is swept out of the carrier into a receptacle, and finally the carrier comes to rest at the loading station with the jaws open ready to receive another tip blank.

These and other features of the invention including certain details of construction and combinations of parts will be described as embodied in an illustrated apparatus and pointed out in the appended claims.

Referring now to the accompanying drawings,

Fig. 2 is a plan,

Fig. 4 is a front elevation of the same mechanisms,

Figure 5:
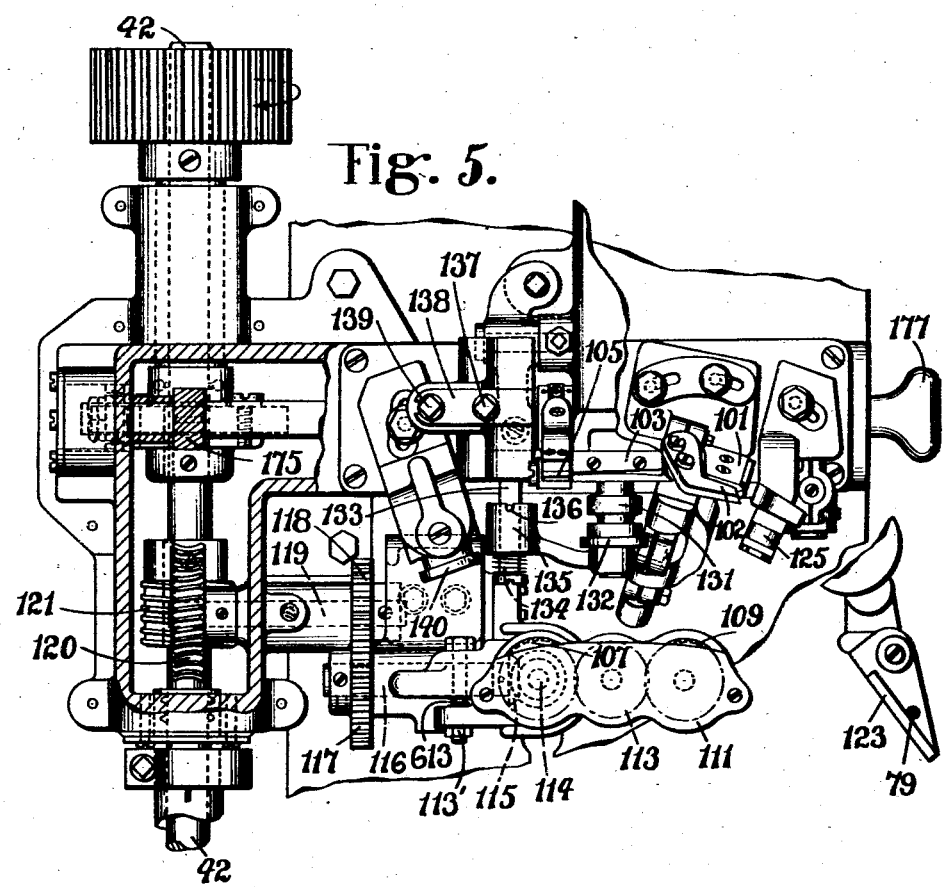
Figure 6:
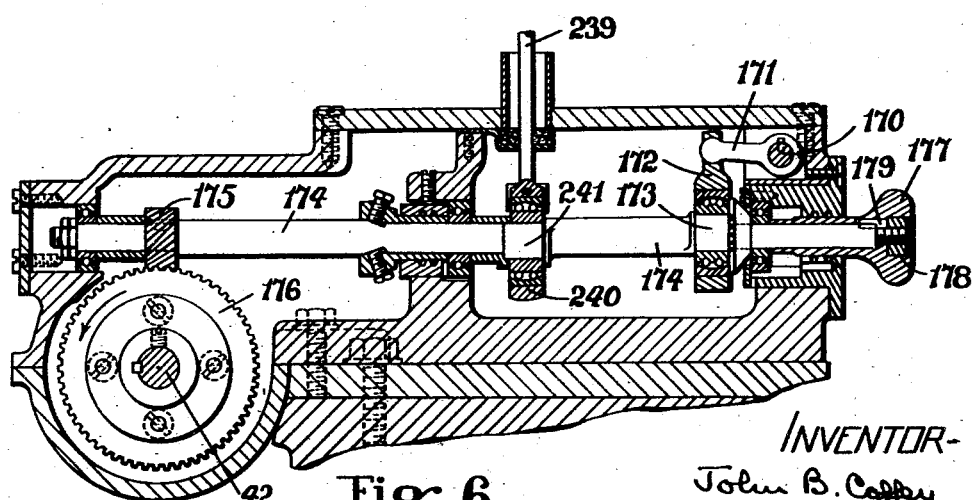
Figure 15:
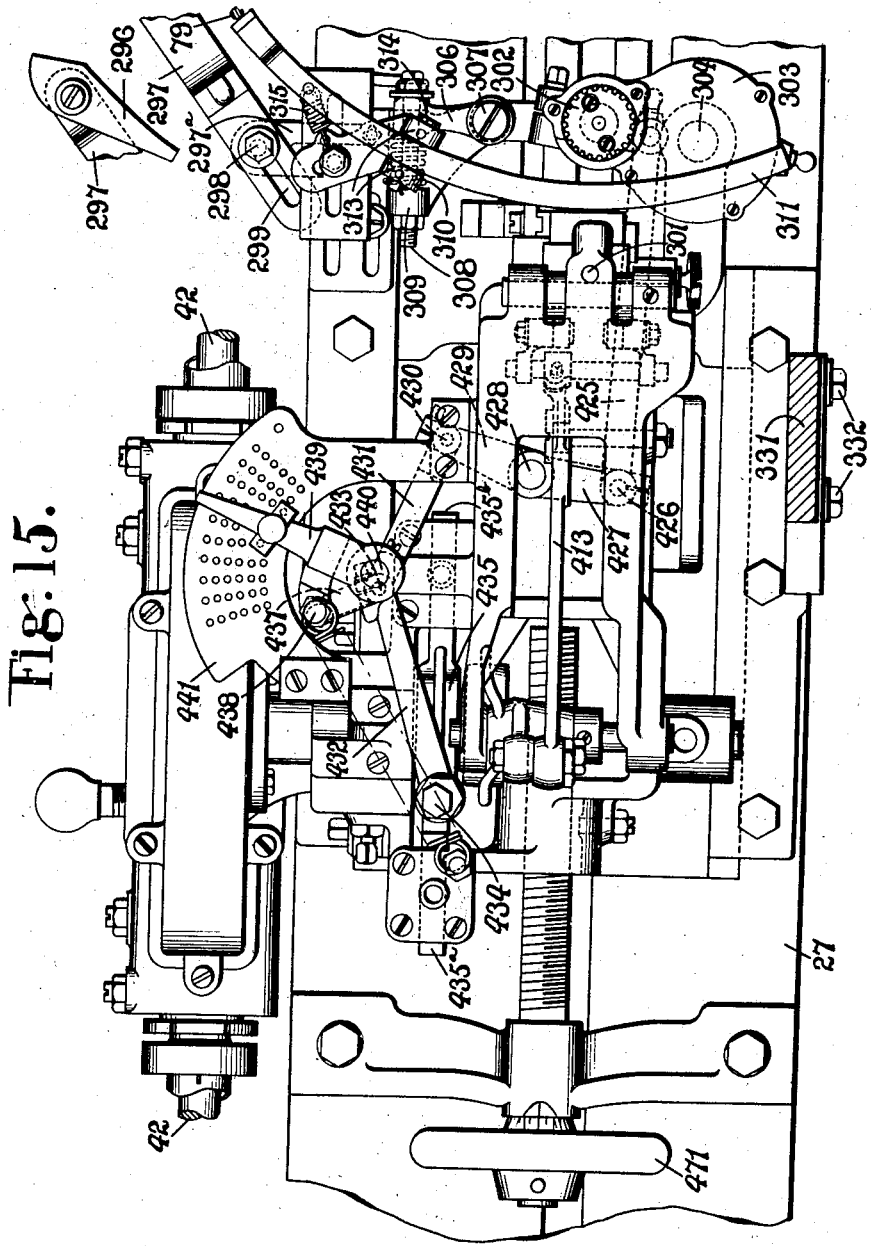

Fig. 4ª is a detail in perspective of the mechanism for controlling the feeding of tip carriers past the punching mechanism, Fig. 5 is a view principally in plan of the skiving and shrinking mechanisms, Fig. 6 is a vertical section through the mechanism which drives the skiving and shrinking mechanisms, the shaft 174 being shown in full lines, Fig. 7 is a perspective of the skiving mechanism, Fig. 8 is a plan of the skiving mechanism and a part of the shrinking mechanism, Fig. 9 is a section on the line IX—IX of Fig. 8, Fig. 10 is a front elevation of the shrinking mechanism, the hammer having been omitted, Fig. 11 is an end elevation of the parts shown in Fig. 10, certain parts having been broken away, Fig. 12 is a front elevation of the delivery station and the loading station, Fig. 13 is a plan showing more particularly the loading station, and a tip carrier at said station, Fig. 14 is a view partly in section and partly in elevation showing the friction means for driving the tip carriers, and the mechanism for engaging the carriers at the loading station, Fig. 15 is a plan of the punching mechanism, Fig. 16 is a front elevation of the same mechanism, Fig. 17 is a plan view of a tip carrier, Fig. 18 is a side elevation of the carrier, Fig. 19 is a wiring diagram of the electric system for supplying current to the shrinking tool.

Fig. 20 is a vertical section through the carrier feeding means associated with the punching mechanism, and Fig. 21 is a section on the line XXI—XXI of Fig. 20.

The purpose of the illustrated machine, as has been indicated, is to skive and shrink the margin at the rear edge of a toe tip so as to produce a finished edge, and then to punch a row of ornamental holes along said rear edge. The skiving and shrinking operations are performed at one station and the punching operation is performed at another station, the skiving and shrinking mechanisms being indicated as a whole in Fig. 2 by the letter B, and the punching mechanism by the letter C. Referring now to said figure, a toe tip 100 is presented at a loading station A over a work table to one of a plurality of tip carriers D which at that time is at rest in position to receive it. The tip carriers D are mounted for rotation in a counterclockwise direction about a center post and in so doing present the tips, first to the skiving and shrinking mechanism B, then to the punching mechanism C, then to a delivery station E where the finished tips are removed from the carriers, after which they return to the loading station A empty. The carriers are driven frictionally independently of one another by mechanism which is independent of the mechanisms which drive the skiving and shrinking mechanism B and the punching mechanism C. As a carrier approaches the skiving and shrinking mechanism, it is engaged positively by another driving or feeding means associated with that mechanism and fed continuously at a suitable speed past the skiving and shrinking instrumentalities. After the completion of the shrinking operation the carrier is released to its friction drive again which moves it to the punching mechanism. Here again the carrier is engaged by driving or feeding means which is associated with the punching mechanism and is fed, intermittently this time, past the punching mechanism. After the completion of the punching operation the carrier is again released to its friction driving mechanism which then moves it past the delivery station E where the finished tip is removed from the carrier, and then to the loading station A where it is stopped with its parts in position to receive another tip. At this loading station the operator presents a new tip to the carrier and depresses a treadle which causes the carrier to grip the blank and at the same time releases the carrier from the abutment which brought it to rest so that its friction driving means once more moves it to the skiving and shrinking mechanisms. The operator, then, stands at the loading station A, presents a tip to each carrier as it stops there, and then depresses a treadle to cause the carrier to grip the tip and to release the carrier so that it may again be moved through its circular path in the manner which has been outlined above.

In order to provide for operating upon the rear edges of toe tip blanks having different radii of curvature, the carrier sustaining and driving mechanism, as well as the punching mechanism, is adjustable on the bed of the apparatus toward and from the skiving and shrinking mechanisms so as to permit the diameter of the circular path of the tip carriers to be increased or decreased; and the work table at the loading station is adjustable for the same purpose with the carrier driving mechanism as well as toward and from the axis about which the carriers revolve. The shrinking mechanism is also adjustable toward and from the post upon which the friction driving means for the tip carriers is mounted, but the extent of this adjustment is small, the purpose of it being principally to adjust its position with respect to the position of the skiving mechanism for a purpose which will appear later.

The construction and mode of operation of the apparatus is similar in many respects to that shown and described in the application referred to above, and reference will be made to the application for certain details not herein set forth.

Referring more particularly to Figs. 13 and 14, the friction mechanism for driving the carriers impositively from the loading station A first to the skiving and shrinking mechanisms B, then to the punching mechanism C and finally back to the loading station A will be described. The tip carriers are respectively mounted upon the outer ends of hollow arms 21, each arm being fastened at its inner end to a hub which is rotatable upon an upright hollow shaft 22, said shaft being rotatable upon a stationary upright post 23 the lower end of which is firmly held by a set screw 24 in a socket in a large boss 25 which is integral with a base 26, said base being adjustable on the base plate 27 of the apparatus, as has been indicated, toward and from the skiving and shrinking mechanisms. The lower end of the shaft 22 has a hub of considerable size which rests upon the top of the boss 25. The hubs of the arms 21 and their impositive frictional connections with the rotating shaft 22 are substantially alike, and consequently only one of them will be described in detail. The lower hub 28 of the lower arm 21 has pinned to it two fibre washers 29 one above and one below the hub. These washers are thus really part of the hub and provide friction surfaces upon its upper and lower sides. The lower washer 29 rests upon the flat upper surface of the hub of the rotatable shaft 22. The upper washer bears against the under face of a driving disk 30 the hub of which is slidably keyed to the rotatable shaft by a key 31. The hubs of the other arms have similar washers fast to them the lower washer of each hub bearing against the upper flat face of the driving disk below it and the upper washer bearing against the under flat face of the driving disk above it. Referring to the upper arm 21, its hub is indicated at 28', its friction washers at 29', its friction driving disk at 30', and the pins which fasten the friction washers to the hub at 32. The corresponding pins of the lower hub 28 do not appear because of the angular position of that hub. An oil groove 32', in the outer surface of the rotatable shaft 22, communicates with holes 33' in the friction driving disks whereby oil may be supplied to lubricate the contacting surfaces of the friction driving disks and the hubs. These superposed hubs with their friction surfaces and the friction driving disks are held in firm contact with one another by a leaf spring having a plurality of arms 33 which press downwardly upon the upper face of the uppermost friction driving disk, said spring being held under tension by a nut 34 threaded upon the upper end of the rotatable shaft 22 and held in adjusted position by a set screw 35. With this construction the arms 21 will all be rotated with the rotatable shaft 22 as long as all are free thus to rotate, but any arm may be retarded in its movement or held stationary; and, when one arm is thus retarded or arrested, the others will continue to rotate with the rotatable shaft 22. This shaft 22 is rotated continuously by means of a sprocket chain 36 which passes around a sprocket 37, fast to the hub at the lower end of the shaft 22, and around a sprocket 38 at the upper end of a vertical shaft 39 rotatably mounted in bearings supported by the bed plate 27, the lower end of said shaft having fast to it a worm wheel 40 which meshes with a worm 41 on the main driving shaft 42.

The mechanism which has just been described serves to rotate the arms 21 with their tip carriers at a considerable speed about the axis of the spindle 23 but permits any selected arm or arms to be retarded or held stationary when desired without affecting the movement of the remaining arms. For example, assuming for the purposes of explanation that one arm, with its carrier holding a toe tip, has been released at the loading station A (Fig. 2) and that this arm is not hampered in its movements by the other arms and carriers, it will travel rapidly until the carrier is engaged, in a manner presently to be described, by the feed mechanism of the skiving and shrinking mechanism B. This feed mechanism comprises a gear which engages a rack on the carrier. It is positive in its action, and feeds the tip carrier at a somewhat slower speed than that of the friction driving means. The comparatively slow feeding movement of the tip carrier continues until the skiving and shrinking operations have been finished, when the tip carrier is released once more to its friction driving mechanism which causes it to move rapidly to the punching mechanism C. Here again its movement is retarded during the punching operation, after which it moves rapidly past the delivery station E and comes to rest at the loading station A. In the illustrated machine, which has six arms and six carriers, no one arm will move rapidly under its friction drive in all parts of its path of rapid movement as described above, since a trailing carrier will be retarded or arrested by contact with a slow moving or stationary leading carrier, but the friction drive mechanism is always ready to move a tip carrier rapidly whenever said carrier is free so to be moved.

Referring again to Figs. 13 and 14, there is mounted upon the top of the stationary post 23, a counter or indicator mechanism comprising a stationary casing 43 and a rotatable disk 44 having upon its upper face a plurality of small bosses 45 one for each arm 21. As the disk revolves, these bosses in succession swing a small lever 47 which operates in the usual manner a mechanism to indicate the number of complete revolutions made by the tip carriers. The disk 44 is rotated from the upper arm 21 by means of a fork 48 which is rigid with the disk and straddles the arm.

Turning now to Figs. 17 and 18, the tip carriers will be described; and since these carriers are identical in construction only one will be described in detail. Each tip carrier comprises a frame or base 53 having integral with it the lower jaw 54 of what will be called the main clamp and also having rigid with it and depending from its under side a rack 55 adapted to be engaged by gears at the skiving and shrinking unit B and again by another gear at the punching mechanism C to feed the carrier in a suitable manner respectively past these mechanisms.

Figure 2:
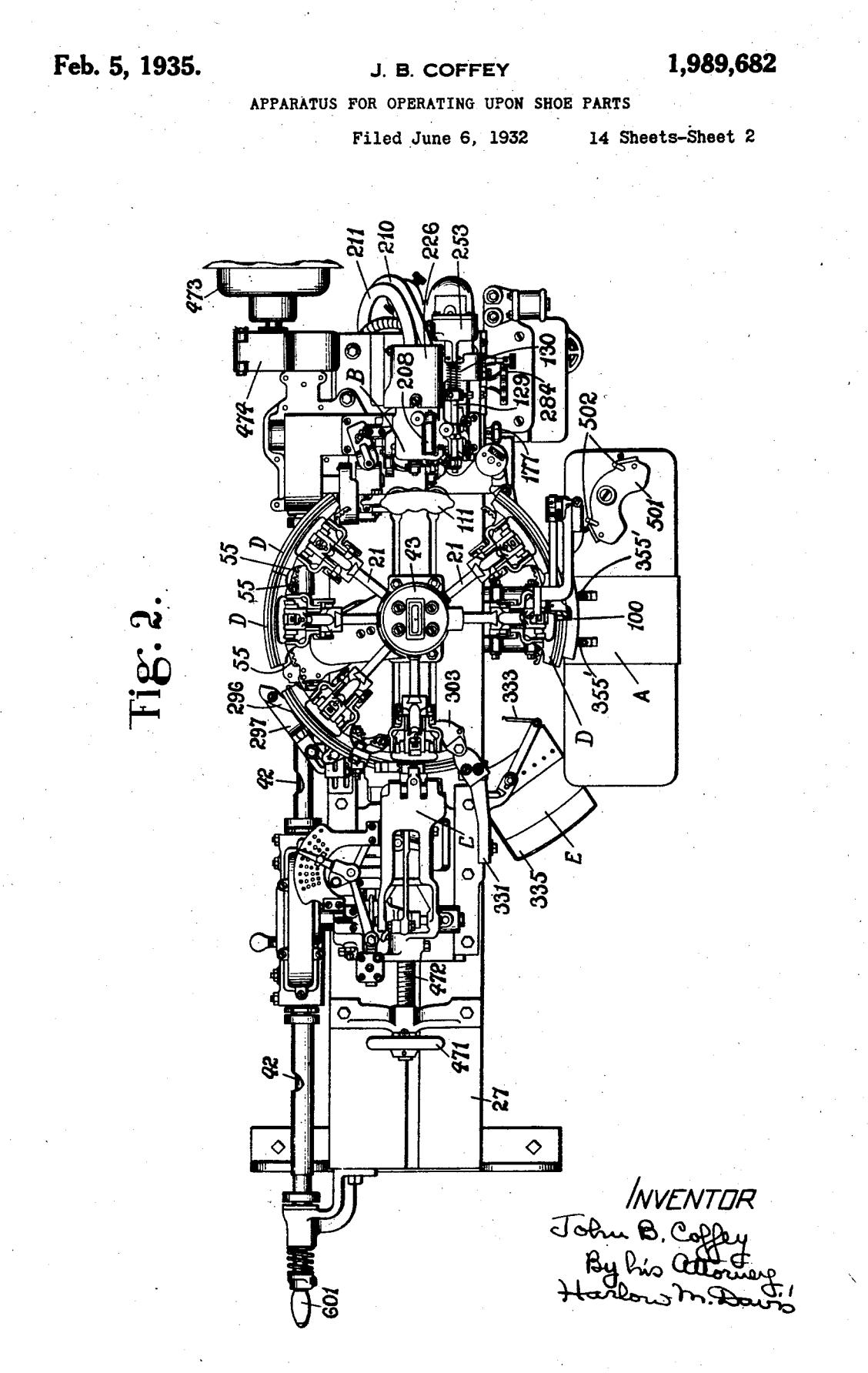

The ends of each rack of each carrier are so constructed that it may overlap to some extent the end of the rack of the carrier which is ahead of it and the end of the rack of the carrier which follows it so that two or more of the carriers may at times be close together as are two of the carriers D in Figure 2. This construction is shown best in Fig. 4ª in which a leading carrier has been indicated at D' and a following carrier at $D^2$. The leading end of each rack (the right-hand end of the rack 55 of the carrier $D^2$) is cut away on its under side; and the trailing end of the rack 55 of the carrier D' is cut away on its upper side so that these two cut-away ends may overlap.

Returning again to Figs. 17 and 18, the upper jaw 56 of the main clamp is carried at the outer ends of two arms 57, the inner ends of which are fast to opposite ends of a small rock-shaft 58 rotatable in a bearing in the frame. Toggle levers 59, 60 are provided for swinging the upper jaw 56 from the closed position, shown in full lines in Fig. 18, to the open dotted line position shown in the same figure and back again. The upper lever 59 is of an inverted T shape, and there are two lower levers 60 (best shown in Fig. 12) pivoted about the alined axes of screws 63, 63' which pass loosely through the upper ends of the levers 60 and are threaded into the ends of the crossbar of the inverted T-shaped upper lever 59. The lower ends of the levers 60 are pivoted respectively by means of pivots 61, 61' to bosses on the upper side of the upper jaw 56 of the main clamp. The upper ends of the levers 60 are slotted where they receive the alined pivots 63, 63' and are hollow to receive compression springs 64. The compression spring 64 shown in Fig. 18 extends between the pivot 63 and the pivot 61 of one of the levers 60, and a similar spring is similarly located in the other lever 60. Thus, when the toggle levers are straightened, a yielding pressure is exerted upon the jaw 56 of the main clamp to close it. The upright stem of the upper lever 59 of the toggle is pivoted at its upper end about a small horizontal rod 65 carried by the frame, said upper lever 59 of the toggle having an extension 66 which contacts with the stop pin 67 when the toggle is broken, as shown in dotted lines in Fig. 18. When the carrier reaches the loading station A (Fig. 2), the toggle is broken and the jaw 56 is in raised position. At that time, an abutment, presently to be described, engages the extension 66, which is then in the dotted line position (Fig. 18) and arrests the movement of the carrier. The operator places a toe tip between the open jaws 54, 56 of the main clamp with the rear margin of the tip projecting to a considerable extent from the jaws and depresses a treadle. This closes the jaws of the clamp by straightening the toggle and at the same time moves the extension 66 from dotted line to full line position (Fig. 18) and thereby releases the carrier so that it begins to move toward the skiving and shrinking mechanisms.

It is desirable that only a small extent of the rear margin of a toe tip be exposed to the action of the skiving and shrinking mechanisms. In other words, the tip should be clamped very close to its rear edge during these two operations. When, however, the carrier reaches the punching mechanism, a considerable extent of the rear portion of the tip must project from the carrier so as to permit an ornamental row of holes to be punched in the margin. Consequently each carrier is provided with two clamps made up each of a pair of jaws. These will be termed respectively the main clamp and the auxiliary clamp. The main clamp has been described above.

The auxiliary clamp comprises two jaws which are slidable in unison nearer to or farther from the rear edge of a toe tip which is held by the jaws 54, 56 of the main clamp. When a carrier with a toe tip held by the main jaws leaves the loading station, the auxiliary jaws are nearly but not quite closed upon the toe tip and are in their inner or retracted position. As the carrier approaches the skiving and shrinking mechanism the auxiliary jaws are pulled out or projected and caused to grip the toe tip close to its rear edge. As the carrier leaves this mechanism, their grip upon the toe tip is released; and before the carrier presents the tip to the punching mechanism, the jaws of the auxiliary clamp are retracted so as to expose a considerable extent of the rear portion of the tip.

Referring again to Figs. 17 and 18, the jaws of the auxiliary clamp are indicated respectively at 69 and 70. The lower jaw 69 has a stem projecting rearwardly (to the left in Fig. 18) which is supported for sliding movement from left to right and back again upon two spaced bars or gibs, one being shown at 71, which are fastened to the flat under side of the frame 53 by screws 71'. Rising from the rear end of the stem of the lower auxiliary jaw 69 and integral with it are two arms 69'. Upon studs 72, 73 mounted in these arms are pivoted respectively the inner ends of two arms 74, 75 with the outer ends of which the upper jaw 70 of the auxiliary clamp is rigid. The upper jaw 70 of the auxiliary clamp may thus swing up and down about the alined studs 72, 73; and the auxiliary clamp may be moved as a whole in or out to expose more or less of the rear margin of a toe tip which is engaged by the jaws 54, 56 of the main clamp. In Fig. 18, the jaws 69, 70 of the auxiliary clamp are in their withdrawn or retracted position (their position farthest to the left as viewed in that figure), being releasably held in that position by a leaf spring 74' fastened to the under side of the lower jaw 69 and engaging with its free end a small notch 75' of inverted V-shape formed in a member which is rigid with the frame 53. When the jaws 69, 70 are pulled out or projected, the free end of the spring engages a second notch 76'. The upper jaw 70 of the auxiliary clamp is urged at all times to be swung up into its dotted line position by a tension spring 76 which is fastened at its upper end to a stud 77 on a member 78 rigid with the frame 53 and at its lower end to a stud on the upper jaw 70. This spring also urges the upper jaw 56 of the main clamp to swing up into open dotted line position, since the outer ends of the studs 61, 61' carried by the upper jaw 56 of the main clamp project respectively over narrow ledges 79', 80' on the arms 74, 75 which carry at their outer ends the upper jaw 70 of the auxiliary clamp. When, therefore, the toggle is broken, as shown in dotted lines in Fig. 18, the spring 76 opens both clamps by swinging up their upper jaws; and, when the toggle is straightened, both of these upper jaws are swung down.

When the toggle levers 59, 60 are straightened, the jaw 56 of the main clamp is swung down sufficiently to grip a toe tip firmly between it and the lower jaw 54 of said clamp; but the upper jaw 70 of the auxiliary clamp is not swung down sufficiently to grip the toe tip between it and the lower jaw 69. Instead, the upper jaw 70 is moved down nearly to gripping position. In this nearly closed position the auxiliary jaws 69, 70 are automatically moved out (to the right in Fig. 18) just before the carrier reaches the skiving and shrinking mechanisms by a cam, presently to be described, which engages a pin 79 rigid with the lower jaw 69 and depending therefrom. This cam slides the auxiliary jaws out so as to leave only a narrow width of the margin of the toe tip exposed. By this time the under jaw 69 of the auxiliary clamp has run upon a supporting roll near the skiving and shrinking mechanisms, and a second roll engages the upper jaw 70 in the groove 80 and forces it down so that the jaws 69, 70 grip the toe tip firmly close to its rear edge. The auxiliary jaws 69, 70 are held in gripping relation by the two rolls just mentioned and others presently to be described until the skiving and shrinking operations have been completed. Then, as the carrier continues its movement, these jaws are released; and, as the carrier approaches the punching mechanism, another cam engages the depending pin 79 and retracts or pushes back the auxiliary jaws so as to expose a considerable extent of the margin of the toe tip to the action of the punching mechanism.

Each carrier (Figs. 17 and 18) is mounted on the outer end of the hollow radial arms 21 in such manner that it may be adjusted vertically so that all the carriers may be at the same level. To this end there is formed in the rear portion of the frame 53 of each carrier a vertical dovetailed slot to receive a dovetailed block 82, which has in it a slot 83. A clamping screw 84 mounted in the frame of the carrier extends through this slot; and two screws 85, 86, which are threaded through bores in the block 82 and contact respectively with the upper and the lower sides of the screw 84, provide means for adjusting the carrier up or down when the clamping screw 84 has been loosened. The end of the hollow arm 21 fits over and is spot welded to a stud 21' which is integral with the block 82.

It has been explained that when a carrier reaches the delivery station it is opened and the finished toe tip delivered. The tip is swept or pushed out between the open jaws of the moving carrier by a stationary finger which engages the leading edge of the tip and prevents it from moving with the moving carrier. Assuming for purposes of explanation that the carrier shown in Fig. 17 is moving past the delivery station E (Fig.

2), its movement will be from left to right. At this station, a stationary finger, shown in Fig. 2 and presently to be described, engages the leading edge of the toe tip and arrests it while the carrier moves on. In order to facilitate the proper removal of the toe tip, the carrier (Fig. 17) is provided with an abutment 85' which engages the trailing edge of the blank and cooperates with the stationary finger in properly removing the finished toe tip from the open jaws of the carrier.

Referring now to Fig. 5, the skiving mechanism is of the shear type and comprises a stationary blade 101 and an oscillating blade 102 so constructed and so located with respect to the path of a toe tip held by a moving carrier that the curved edge of the rear margin of the tip is skived on an abrupt angle. Just beyond the skiving mechanism considered in the direction of movement of the carriers is the shrinking mechanism. In Fig. 5 the plow 103 of this mechanism is shown, the shrinking tool and its mounting having been omitted. Referring to Figs. 10 and 11 the shrinking mechanism comprises a generally U-shaped tool 104 made of a high resistance alloy through which a current of electricity is passed to raise it to a sufficiently high temperature so that it will shrink and sear the margin on one side of the leather toe tip whereby the unshrunken side curls toward the shrunken side. As viewed in Fig. 10, a toe tip clamped in a carrier is fed away from the observer with its margin bent up slightly by the plow 103 and held against the hot tool 104. As viewed in Fig. 11, the toe tip is fed from right to left. After the edge of the toe tip has been shrunk and curled in the manner described, it is acted upon by a hammer to round and compact the edge. The shrinking mechanism will be described in detail later.

Referring again to Fig. 5 wherein are shown at 101 and 102 the shear members of the skiving mechanism, at 103 the plow of the shrinking mechanism, and at 105 the hammer of the last-named mechanism, the toe tip carriers, which are moved up to the skiving mechanism by the friction driving mechanism described above, are fed past these two mechanisms by gears 107, 109 which engage the racks of the carriers, one of said racks being indicated at 55 in Fig. 17. This mechanism for feeding the carriers past the skiving and shrinking mechanisms is substantially like that disclosed in the prior application referred to above and will be only briefly described. The gears 107, 109 are mounted in a casing 111 as is also an idle gear 113 by which the gear 109 is driven from the gear 107. The casing 111 is mounted for pivotal movement about the axis of the gear 107 and is normally held in the position shown by a compression spring 613 which normally holds a perforated lug on the casing against a nut 113' threaded on the end of a stationary bolt which passes loosely through the lug. The whole casing may thus be swung about the axis of the gear 107 in a clockwise direction. The purpose of so mounting the casing is to permit the casing to swing slightly, if necessary, when the gear 109 is engaged by the teeth of a rack on one of the moving carriers so as to facilitate proper meshing of the gear and the rack. The gear 107 has a downwardly extending stem 114 to which is fast a bevel gear which meshes with another bevel gear 115 on one end of a short horizontal shaft 116, at the other end of which is a gear 117. This gear meshes with a gear 118 on one end of a short horizontal shaft 119 on the other end of which is a worm wheel 120 in mesh with a worm 121 on the main driving shaft 42.

Assuming that a carrier with a toe tip has left the loading station and is approaching the skiving and shrinking station, the tip is firmly gripped by the jaws of the main clamp. The jaws of the auxiliary clamp are nearly closed but not enough to grip the toe tip, and these jaws are in their withdrawn or retracted position so that a considerable extent of the rear margin of the tip is exposed. As the carrier approaches the skiving and shrinking mechanisms, these auxiliary jaws are pulled out or projected so that only a narrow margin of the toe tip is exposed and are closed firmly upon the tip. The auxiliary jaws are pulled out or projected by a stationary cam 123 (see also Fig. 3) carried by a bracket 274 on the base of the apparatus which engages the pin 79 (Fig. 18), said pin depending from the under side of the lower jaw of the auxiliary clamp. As the carrier is fed past the skiving and shrinking mechanisms, its forward portion passes in succession between three pairs of rolls, which act not only to steady the carrier in its travel but to close the projected jaws of the auxiliary clamp firmly upon the toe tip and hold them thus during the skiving and shrinking operations. The lower fixed roll of the first pair encountered by the moving carrier is indicated at 125 (Fig. 5). The upper roll of this first pair is not shown in Fig. 5 but is shown at 126 in Figs. 3 and 4. This roll 126 is mounted at the lower end of an arm 127 (Fig. 4) the upper end of which is fastened by its split hub and a pinch-screw 128 to the outer end of a horizontal rock-shaft 129 which is acted upon by a torsion spring 130, as in the machine of the application, so as to hold the roll 126 normally in position to ride up on the outer upper portion of the jaw 70 of the auxiliary clamp and push that jaw down firmly upon the toe tip. This roll, by rotating the rock-shaft 129 against the force of the spring 130, also serves to increase the flow of electric current to the shrinking tool as will presently appear.

Referring again to Fig. 5, the jaws of the auxiliary clamp next pass between a fixed lower roll 131 and a yielding upper roll 132 carried by a stem the hub of which is held from rotation with respect to a small horizontal rock-shaft 133 by a compression spring 134 which holds a notch in the hub 135 in engagement with a pin 136 driven into the rock-shaft. The connection of the roll 132 with the rock-shaft 133 permits the roll 132 to be swung up out of the way when it is desired to inspect parts beneath it. To free the hub 135 from the pin 136, it is necessary merely to push the hub away from the pin 136 against the force of the spring 134, whereupon the hub may be rotated on the shaft 133. The narrow peripheral rib or flange on the roll 132 runs in the groove 80 (Fig. 18) in the upper jaw 70 of the auxiliary clamp. In order to hold the roll yieldingly in the position shown, the small rock-shaft 133 has fastened to it by a pinch-bolt 137 the hub of a small horizontal arm 138. Threaded through the outer end of this small arm 138 is a screw bolt 139 beneath which is a compression spring (not shown) resting upon the bottom of a socket in the frame. This spring, by pushing up on the lower end of the screw 139, tends to rock the small shaft 133 and to hold the roll 132 down. Of the third pair of rolls (Fig. 5), only the upper roll 140 is visible, the lower fixed roll of this third pair being below the roll 140 which is capable of yielding upwardly. This roll 140 (Fig. 4) is mounted at the lower end of a small vertical rod 141 which is vertically slidable in bearings in a bracket rigid with the base of the apparatus. A compression spring 142 normally holds a nut 143 on the rod in contact with part of the bracket.

Referring now more particularly to Figs. 7 and 8, the skiving mechanism will be described. The skiving mechanism is supported upon a plate 152 which is angularly adjustable upon a stationary part, said part being rigid with the base of the whole apparatus and being fastened thereto by cap screws 153 which pass through curved slots 154 in said plate. This plate has an upwardly projecting arm 155 integral with it to which is pivoted at 156 an arm 157, said arm 157 being held in position about the pivot 156 by a cap screw 158 the stem of which passes through an enlarged hole 158' in the arm 157 and is threaded into the arm 155. This enlarged hole also permits the pivot 156 to be raised and lowered slightly by turning an eccentric bushing through which the pivot 156 passes, said bushing having a hexagonal head 159' by which it may be turned when the cap screw 158 has been loosened. The arm 157 has integral with it a casting, including two spaced lugs 159, which carries the work engaging shear blades of the skiving mechanism.

The stationary shear blade 101 is fastened by screws 160 to the top of this casting. In order to support the margin of a toe tip during the skiving operation there is provided a narrow support or table 160' a depending flange on which is adjustably fastened to the casting by a screw 161 which passes through a curved slot in the flange and is threaded into the casting. The upper face of this support 160' is inclined to the plane of the upper face of the stationary shear member 101; and the support is so adjusted that the edges of the toe tips are beveled on a substantially forty-five degree angle. The oscillating shear blade 102 is fastened by screws 162' to the top of a shaft 162 which is rotatably mounted in alined bearings formed in the alined lugs 159 and has fastened to it near its lower end a pinch-collar 163. Fastened to the shaft 162 between the lugs 159 by a pinch-screw 164 is a collar 165 by oscillation of which the shaft 162 is oscillated. An extension of collar 165 has at its outer end a split socket bearing, the cap of which is shown at 166 to receive a ball or spherical enlargement upon one end of a horizontal link 167 (Fig. 8), the other end of which has another ball or spherical enlargement 168 received in a split socket bearing 168' carried at the upper end of an arm 169 the hub of which is pinned to a short shaft 170. This short shaft 170 (Fig. 6) has fast to it the hub of an arm 171 the outer end of which has a ball and socket connection with an eccentric strap 172 operated through a ball bearing from an eccentric 173 on a shaft 174 which is driven continuously through a small spiral gear 175 and a larger spiral gear 176 from the main driving shaft 42. The shaft 174 has at its outer end a hand-hold 177 fastened to the tapered outer end of the shaft 174 by a nut 178 and a key 179. This hand-hold furnishes a means for turning over the whole apparatus by hand, when desired, but is particularly useful in operating the skiving mechanism by hand during adjustment of said mechanism since it is near that end of the apparatus at which the skiving mechanism is located. There is another means for rotating the driving shaft 42 by hand, namely the crank 601 (Fig. 2), which is located at the other end of the apparatus.

The movable shear member or blade 102 of the skiving mechanism is oscillated continuously while the apparatus is running and operates in conjunction with the stationary member or blade 101 to skive the edges of the toe tips which are presented to said mechanism by the moving carriers. It will be noted that, by reason of the mounting of the plate 152 (Fig. 8), the shear members of the skiving mechanism may be adjusted angularly in a horizontal path; and that by reason of the mounting of the arm 157 (Fig. 7) the shear members 102, 101 may be raised and lowered by turning the head 159' of the eccentric bushing in which the stem of the pivot 156 is mounted. In order to take care of the chips or skivings as they are produced, a deflector 190 (Fig. 7) deflects them into the mouth of a passageway 191 which leads away from the skiving blades. This passageway is formed in a portion 192 (Fig. 4) of the frame of the shrinking mechanism.

Referring now more particularly to Figs. 10 and 11 the shrinking mechanism will be described. The plow 103 which acts to bend up the edge of a toe tip and hold the bent up edge against the shrinking tool 104, is fastened by screws to the frame of the mechanism. The shrinking tool, however, and the structure upon which it is mounted may be swung up, for example when it is desired to remove and replace a tool.

The tool and the manner in which it is mounted is very similar to the corresponding structure of the machine of the application referred to above. The tool 104 is substantially U-shaped. The left-hand upstanding leg of the tool is fastened to the lower end of the downwardly extending portion of a bent terminal 204 which is rigidly fastened to a casting 205 by plates and clamping screws 206. The right-hand leg of the tool is fastened to the lower end of the downwardly extending portion of a second bent terminal 207, said terminal being fastened to an arm 208, the upper cylindrical portion of which is engaged at its opposite ends by alined pivot screws 209 which are threaded through lugs on the casting 205. The terminals 204, 207 are part of an electric circuit and have horizontally extending upper portions, that of the terminal 207 being shown in Fig. 10, to the right-hand ends of which, as viewed in Fig. 10, are attached cables through which an electric current flows to heat the tool 104. The cable 210 which is connected to the terminal 207 is shown in Fig. 10; and both cables 210 and 211 appear in Figure 4. The purpose of mounting the terminal 207 (Fig. 11) for swinging movement toward and from the terminal 204 is to provide for expansion and contraction of the comparatively long shrinking tool 104 due to heating and cooling of the tool.

It is desirable to provide means for adjusting the tool 104 (Fig. 10) toward and from the upright face of the plow 103; and to this end the casting 205 is pivoted about the alined axes of conical pointed screws 213, 214 which are threaded through the outer ends of the arms of a fork which is integral with a main supporting member 215. In order to swing the casting 205 about the common axis of the bearing screws 213, 214, an adjusting screw 216 is threaded through the upper, horizontally extending portion of the casting 205 and bears against a lug 217 formed upon the upper side of the supporting member 215. By turning the adjusting screw 216, the casting 205 is swung angularly, and the shrinking tool 104 is moved toward or from the plow 103. A lock-nut 218 holds the screw 216 in adjusted position. The supporting member 215 has at its rear end (the right-hand end in Fig. 10) two spaced depending lugs 215ª, 215ᵇ, both of which are shown in Fig. 11. Through these lugs are threaded alined bearing screws 219, 220 the conical inner ends of which enter conical sockets in the frame of the shrinking mechanism. It is thus possible to adjust the main supporting member 215 up and down about the alined axes of the pivot screws 219, 220 and thereby to adjust the shrinking tool 104 up and down to take care of pieces of work of different thicknesses.

It is desirable not only to adjust the tool up and down, but to lock it firmly in desired adjusted position. To this end an adjusting screw 221 is threaded through a part of the main supporting member 215, said screw having at its lower end a generally spherical enlargement 221ª which enters a socket in the frame and may be held firmly in the socket, so that the supporting member 215 cannot then rise, by a small plate 222 which is slidable on a portion of the frame so that it partially overlies the ball and is held from vertical movement, a set screw 223 being provided to lock the slide. A lock-nut 224 is provided on the stem of the screw 221 to prevent the screw from accidental turning. Fastened to the rear end of the main supporting member 215 is an upstanding plate 215ᶜ having holes to receive insulating sleeves, one of which is shown at 225 through which the cables of the electric circuit pass. A cover 226 has at its rear end two spaced depending lugs through which alined pivot screws, one of which is shown at 227, are threaded, said screws having conical ends which are received in conical sockets in the plate 215ᶜ. Through the forward end of this cover passes a small screw 228 which is threaded into the rear part of the horizontally extending portion of the casting 205. It will thus be seen that the whole structure including the shrinking tool and its mounting may be swung up about the alined axes of the pivot screws 219, 220, when desired, that with the parts in the position shown, the whole structure may be adjusted about the same axes to raise and lower the shrinking tool 104 by manipulating the screw 221, and that the casting 205 may be swung about the alined axes of the pivot screws 213, 214 to regulate the distance between the shrinking tool and the upright face of the plow 103 by manipulating the adjusting screw 216. When the main supporting member 215 is swung up about the alined axes of the pivot screws 219, 220 for the purpose of replacing a shrinking tool, it is desirable to provide means for holding it in that position. For this purpose (Fig. 10) the farther end of the stem of a horizontal pin having a head 227', which extends through a bore in the lug 215ª, may be thrust into a bore 228' formed in a stationary member.

The shrinking mechanism includes not only the plow 103 and the hot tool 104 but a hammer, which acts upon the hot and shrunken edge of the work to compact and round the edge. Referring now to Figs. 8 and 9, the hammer 230 is located close to one end of the plow 103 and cooperates with a stationary anvil 231 over which the edge of a toe tip is fed by a toe tip carrier. The hammer is mounted on a horizontal pivot 232 carried at the outer end of a lever 233 pivoted near its middle about a short stud 234, the inner end of the lever being normally held up by a compression spring 235 against a stop in the form of the head of a bolt 236 the stem of which passes loosely through a hole in the lever and is threaded through a stationary member and held firmly by a lock-nut 237. In order to oscillate the hammer 230 about its floating pivot 232, the tail of the hammer is pivoted at 238 to the upper end of a small connecting rod 239 the lower end of which is connected to an eccentric strap 240 (Fig. 6) which is operated through a ball bearing from a cam 241 on the same shaft 174 which drives the skiving mechanism. Returning to Figure 9, it will be seen that when the connecting rod moves up, the hammer descends upon the work on the anvil 231, and that the hammer will accommodate its final downward position to the thickness of the work, since the floating pivot 232 may move upward against the force of the spring 235 at any time when a thick piece of work is encountered.

The shrinking tool is maintained at a low heat at all times when it is not operating upon a piece of work by a small current of electricity which passes through it. When, however, a carrier with a toe tip approaches the skiving and shrinking mechanisms, it operates a switch which cuts out a resistance and permits a heavy current to pass through the shrinking tool thereby raising its temperature to a point at which it will sear and shrink the leather along the edge of the toe tip. This switch is of the well-known mercury type, is contained in a switch box 253 (Fig. 4), and is operated by rocking the horizontal shaft 129, said shaft being rocked, as has been explained, when the leading end of a toe tip carrier passes beneath the roll 126 which thereupon rides up upon the upper jaw of the auxiliary clamp and forces that jaw into firm gripping relation with the margin of a toe tip which projects from the carrier. The switch box is supported by an integral extension which is fastened by screws, one of which is shown at 254, to the upper face of the lug 215ª, said lug being part of the main supporting member 215 of the shrinking tool. The switch box consequently swings with the member 215 when that member is swung about the alined axes of the pivot screws 219, 220. The switch, not shown, is operated as has been stated by rocking the shaft 129. This rock-shaft has one bearing in the lug 215ª and another in a lug 215ᵈ, both lugs being rigid with the main supporting member 215. The torsion spring 130, fastened at one end to the lug 215ª and at the other end to a collar 255 fast to the rock-shaft normally holds the shaft in such position that the switch is open. It is rocked to close the switch and increase the current by the engagement of a tip carrier with the roll 126, as has been stated. Just before the shrinking operation on a tip has been completed, the trailing end of the tip carrier passes from beneath the roll 126, whereupon the switch is opened and only a small current passes through the tool until another tip carrier engages the roll 126. The shrinking tool is thus normally at a comparatively low temperature but is raised to the desired high temperature just before a toe tip is presented to it.

Any suitable electrical circuit may be employed. In the present instance the wiring diagram is shown in Fig. 19. One of the line wires 256 leads directly to one terminal of the primary coil 257 of a transformer. The other line wire 258 leads through a resistance 259 to the other terminal of the primary coil. There is provided, however, a switch 260 by which the resistance may be cut out; and in the illustrated machine, this switch is of the mercury type and is contained in the switch box 253 (Fig. 4). From one terminal of the secondary coil 261 of the transformer, a conductor 263 leads to one terminal of a choke coil 265, while from the other terminal of the choke coil a conductor 267 leads to one of the legs of the shrinking tool. A second conductor 269 leads directly from the other terminal of the secondary coil 261 to the other leg of the shrinking tool. With the switch closed, the variable choke coil is set to produce the desired maximum current through the shrinking tool. When the switch is open, only a small current passes through the primary coil of the transformer, and only a small secondary current passes through the shrinking tool; but when the switch is closed to cut out the resistance, a heavy current is induced in the secondary circuit which raises the shrinking tool to the desired temperature.

It is sometimes desirable to treat the surface of the rear margin of tips with oil, particularly if the tips are made of patent leather. To this end a receptacle for oil 270 (Fig. 4), having a wick of felt 271, has depending from it a round stem 272 which is held in adjusted vertical and angular position by a set screw 273 in a vertical bore formed in a lug integral with the stationary bracket 274 which supports the cam 123 by the action of which upon the pin 79 (Fig. 18) of a carrier, the jaws of the auxiliary clamp of the carrier are pulled out to lessen the extent of the margin of the tip which is exposed. The receptacle is shown in inoperative position but may be moved into operative position when the set screw 273 is loosened, and may thereafter be held in said last-named position by tightening the screw.

Figure 3:
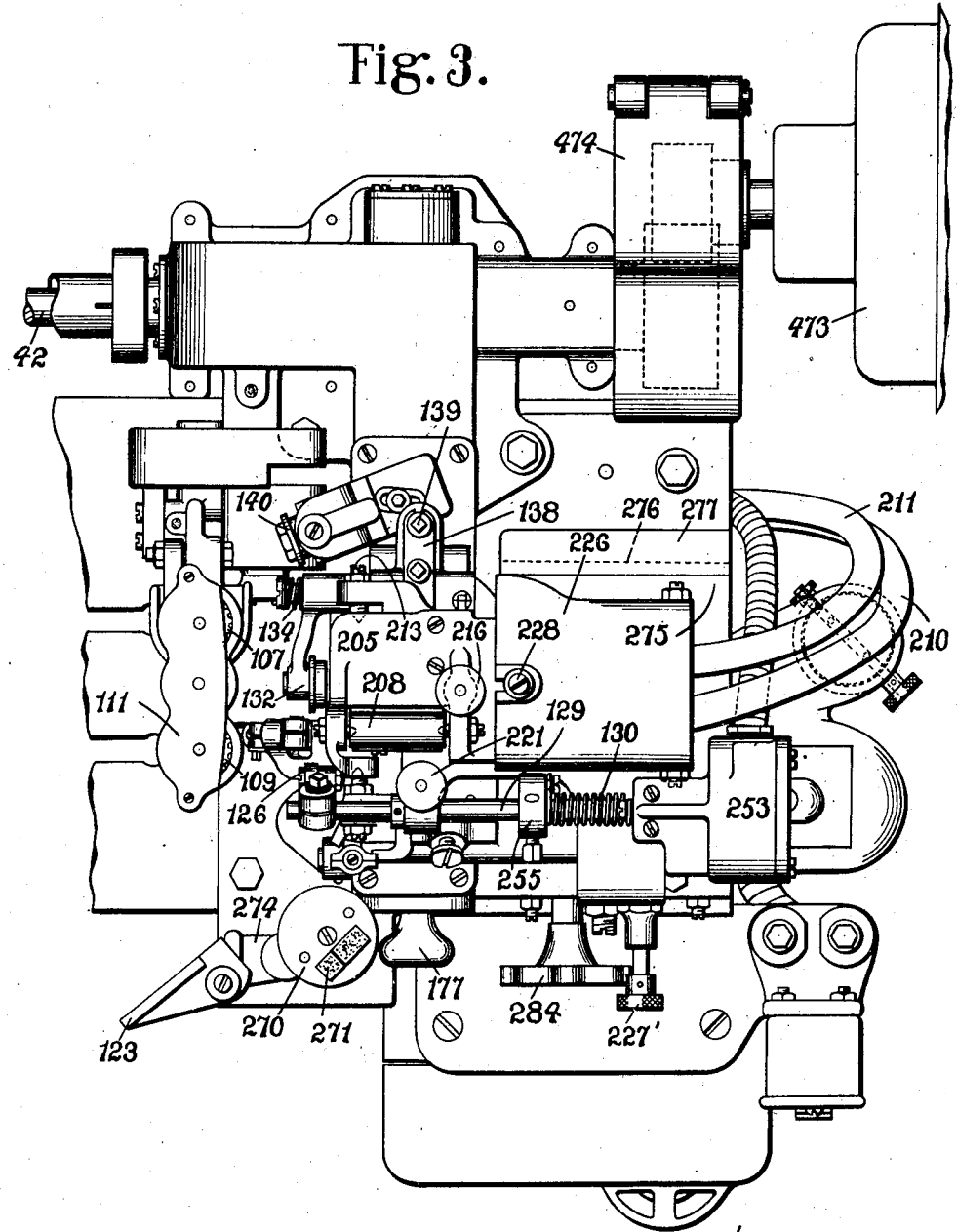
Fig. 3 is a plan of the skiving and shrinking mechanisms.

It will be understood that the whole apparatus is set up and adjusted to operate upon tips the rear edges of which have a given radius of curvature and that, when tips of a different radius of curvature are to be operated upon, a new set of tip carriers the forward edges of which have the desired radius of curvature must be installed and the various mechanisms properly adjusted. The various adjustments are so made that the skiving mechanism removes a very narrow chip or skiving from the rear edge of the toe tips. Inasmuch as different kinds of leather should be bent up to different extents by the plow 103 (Fig. 19) of the shrinking mechanism, provision is made for adjusting the shrinking mechanism independently of the skiving mechanism toward and from the center post 23 (Fig. 14) about which the friction driving means for the tip carriers rotates. Referring to Fig. 3, the frame of the shrinking mechanism is mounted upon a horizontal sliding plate 275 having the edge which is there shown beveled to the dotted line 276, said beveled edge being engaged and held down by a portion 277 integral with the base of the apparatus and having an undercut edge to receive the beveled edge of the plate 275. The opposite beveled edge of the plate 275 is engaged by the undercut edge of a gib 278 (Fig. 4) fastened by cap screws 279 to the stationary base of the apparatus. Rotatably mounted in the plate 275, which carries the shrinking mechanism, but held from longitudinal movement with respect thereto is a screw 280 which is threaded into a stationary part of the base of the apparatus. This screw has fast to it a small spiral gear 281 which meshes with a second small spiral gear 282 fast to a small horizontal shaft 283 rotatably mounted in fixed bearings and having a hand wheel 284 by which it may be turned. By turning this hand wheel in one direction or the other, the whole shrinking mechanism may be adjusted in or out (to the right or the left as viewed in Fig. 4) independently of the skiving mechanism to cause the plow 103 (Fig. 10) to turn up the edge of the toe tips more or less, as may be desired. It is thus possible to set the apparatus so that the skiving mechanism will always remove only a very narrow skiving from all tips and to vary the extent to which the skived edge of the tips are turned up by the plow 103.

After a carrier has been moved past the skiving and shrinking mechanisms by the action of the small gears 107, 109 (Fig. 5) with the rack 55 on the under side of the carrier, the rack finally runs off from the gear 107; and the frictional driving means of Fig. 14, which has been slipping during the engagement of the rack with the gears, once more becomes effective, and moves the carrier to the punching mechanism. When the carrier leaves the shrinking mechanism, the jaws of the auxiliary clamp are in projected position, and there is thus exposed only a narrow area of the rear margin of the toe tip. Before the punching mechanism operates, these jaws must be retracted so as to permit a row of ornamental holes to be punched which shall be spaced more or less from the rear edge of the tip. The retraction or withdraw of the jaws of the auxiliary clamp of the tip carrier is caused by a stationary cam 296 (Fig. 15) which engages the depending pin 79 (Fig. 18) of a moving carrier. This cam 296 (Fig. 15) is fastened to the outer end of an arm 297, the inner end of which is adjustably fastened to a stationary bracket 297ª by a screw bolt 298 which passes through a slot 299 in the arm and is threaded into the bracket. The punching mechanism will be described in detail later. It may be noted, however, that the upper end of the stem of the platen of the punching mechanism is shown at 301 in Fig. 15. As a carrier is fed past the punching mechanism the upper surface of the upper jaw of the auxiliary clamp is engaged by a spring-pressed block 301' (Fig. 16) which closes the jaw and steadies the moving carrier.

Each carrier is fed past the punching mechanism by engagement of the rack 55 (Fig. 17) of the carrier with a driven gear which is associated with the punching mechanism, this gear and its mounting being similar to the gears 107, 109 of the skiving and shrinking mechanisms. There is, however, only one rack-engaging gear at the punching station, and it is driven intermittently in timed relation with the punching mechanism. This gear 302 (Fig. 15) is rotatably mounted in a casing 303 which is angularly movable about the vertical stem 304 of another gear 305 (Fig. 20) which is driven intermittently in a manner presently to be described and in turn drives the small rack-engaging gear 302. In order to hold the gear casing 303 normally in such position that the small gear 302 is comparatively near to the punching mechanism as shown, but to permit the end of the gear casing in which the gear 302 is located to swing away from the punching mechanism, if necessary, when it is engaged by the segmental rack on a carrier, there is provided a lever 306 pivoted about a stationary stud 307 and having at each end a fork. The fork at one end (the upper end as viewed in Fig. 15) straddles the stem of a screw 308 threaded through a stationary boss 309, the right-hand end of this fork being normally held against the head of the screw by a compression spring 310. The other end of the pivoted lever 306 has a fork (shown at 310ª in Fig. 4ª) arranged to straddle a member beneath the gear which is rigid with the gear casing. The gear casing 303 is thus yieldingly held in the position shown but may be swung out about the axis of the stem 304. This construction, which is substantially like that of the machine of the application, permits the driving gear 302 to yield if necessary when it is engaged by a rack on one of the tip carriers.

As shown in Fig. 2, the tip carriers come to rest one by one at the loading station A. It will be understood that a following tip carrier will come to rest when it encounters a leading carrier just ahead of it which is at rest. Consequently, it is possible that several tip carriers may come to rest before they reach the loading station. If too many thus come to rest, it may happen that a tip carrier, which is presenting a tip to the punching mechanism may be arrested by contact with the tip carrier ahead of it which is being held stationary. Such an occurrence would of course be undesirable, and consequently means is provided for preventing such an occurrence. This means takes the form of a structure which arrests a following tip carrier before its rack is engaged by the feed gear of the punching mechanism until the tip carrier ahead of it has passed said mechanism. Referring now to Figs. 4ª and 15, a controller in the form of a segmental lever 311 has a depending lug 312 which is received between stationary upstanding ears 313 and is pivoted upon a small horizontal stud 314. The left-hand end (Fig. 4ª) of this lever is normally held down by a tension spring 315; but when this end is raised, in a manner presently to be described and as shown in Fig. 4ª, it lies in the path of the pins 79 which depend from the under side of the tip carriers. Assuming that a tip carrier is moving toward the punching station and that no tip carrier is presenting a tip to the punching mechanism, the left-hand or stop end (Fig. 4ª) of the lever 311 will be held down by the tension spring 315, and the pin 79 of the moving tip carrier will move along just above the lever 311. The right-hand portion of the lever 311 is at that time inclined upwardly due to the pull of the spring 315. As the pin 79 on the tip carrier passes the locality of the pivot 314, said pin will progressively push down the right-hand portion of the lever, thereby raising the left-hand portion so that the left-hand end of the lever will be raised into the path of the pin 79 of the following tip carrier and will bring that tip carrier to rest and hold it stationary until the tip carrier just ahead of it has been fed past the punching mechanism. In Fig. 4ª the pin 79 of a leading tip carrier D' is pressing the right-hand portion of the lever down, and is thereby holding the left-hand portion up so that the left-hand end of the lever has engaged the pin 79 of the following tip carrier D² and brought that tip carrier to rest. As soon as the pin 79 of the tip carrier D' rides off from the right-hand end of the lever 311, the spring 315 will pull the left-hand end of the lever 311 down, whereupon the tip carrier D² will be moved once more by its friction driving mechanism, said mechanism having been slipping while the tip carrier D² was held from forward movement.

Figure 1:
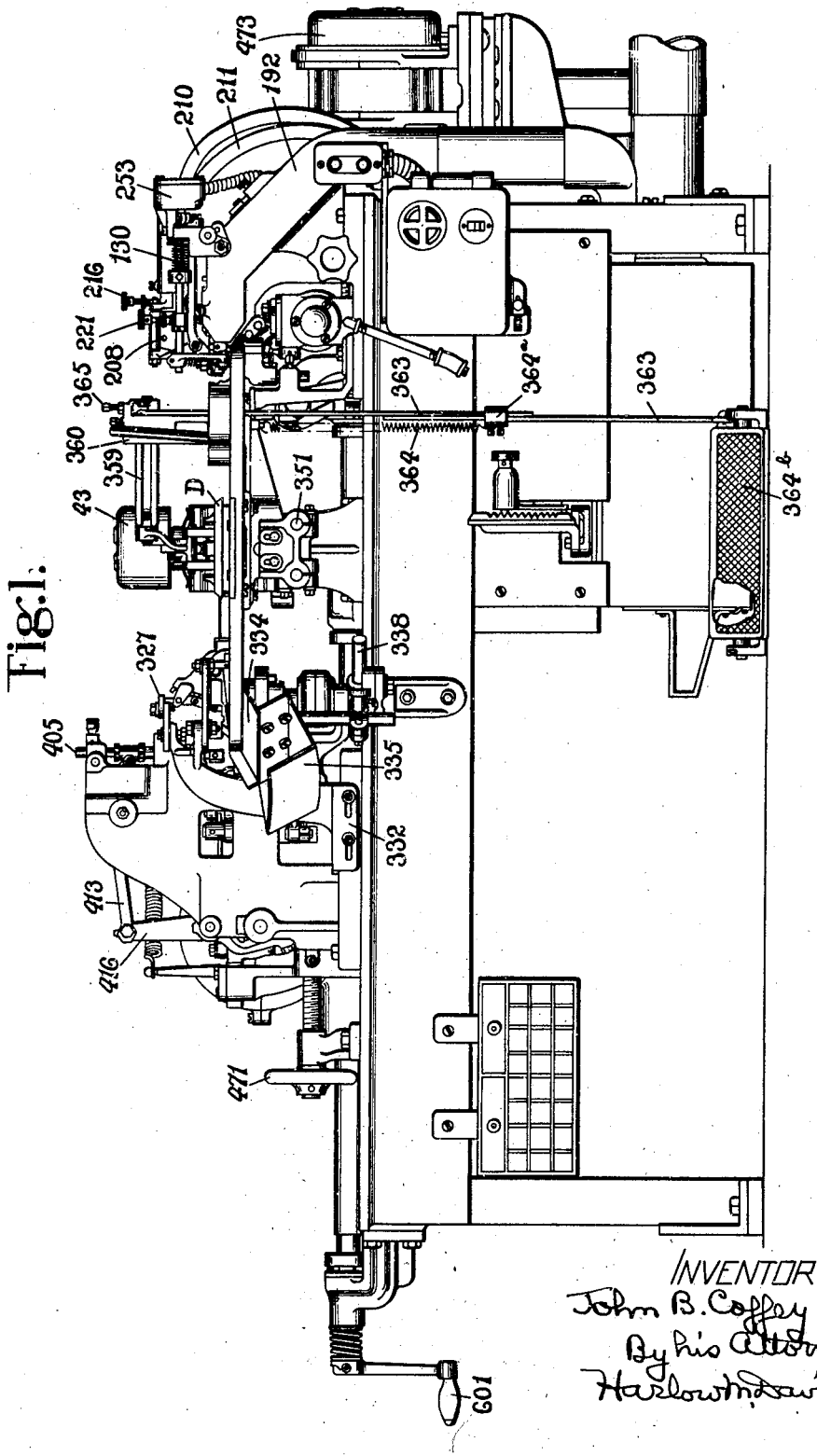
Fig. 1 is a front elevation of an apparatus in which the present invention is embodied.

After a tip carrier has presented a tip to the punching mechanism it is moved by its friction driving means past the delivery station E (Fig. 2) where the clamp of the carrier is opened and the finished tip is swept out of the moving carrier into a chute down which it slides into a receptacle. Referring to Fig. 12, which shows a tip carrier D approaching the delivery station, it will be remembered that the jaws of the main clamp of the carrier are closed upon a toe tip by straightening the toggle levers 59, 60 into the positions shown, and that the upper toggle lever 59 has an extension 66 at its upper end which may be moved into contact with a stop 67 to break the toggle and open the clamp. As a carrier D moves along, this extension is engaged by a stationary cam 327 and pushed back to break the toggle and free the toe tip from the grip of the jaws. This cam is adjustably fastened by a cap screw 328 upon a plate 329 which is fastened by screws 330 to a bracket 331 adjustably fastened by cap screws 332 to the base of the apparatus. As the carrier D continues its movement, a stationary finger 333 (Fig. 2) engages the leading edge of the toe tip and prevents it from moving with the carrier, so that the toe tip is swept out of the moving carrier upon a chute 334 (Fig. 1) down which it slides into a receptacle 335. The chute and the receptacle (Fig. 12) are carried at the upper end of a post 336 mounted for vertical and angular adjustment in a pinch-bearing 337 at one end of a horizontal rod 338, said rod being held in adjusted angular and longitudinal position by a draw-bolt 339 having an eye to receive the rod, a nut 340 on the bolt serving to draw the rod 338 down firmly into rounded recesses in a stationary bracket 341.

The tip carrier leaves the delivery station empty and with its jaws open and is moved to the loading station and brought to rest to receive another toe tip. Referring now more particularly to Fig. 14, the table structure 343 at the loading station A has a depending flange 345, mounted for vertical adjustment on a bar 347, by means of cap screws, one of which is shown at 349, said cap screws passing through slots in the bar and being threaded into the flange 345. This bar 347 is in turn adjustably fastened to the outer ends of two horizontal rods 351 (both of which appear in Fig. 13), by the bar 347, the inner ends of the rods being adjustably fastened in pinch-bearings 353 integral with the base of the mechanism for frictionally driving the tip carriers. When a carrier D reaches the loading station A, the jaws of the clamp are open by reason of the fact that the toggle, comprising the levers 59, 60, is broken, as shown in Fig. 14. In order to bring the carrier to rest an abutment block 355 engages the extension 66 of the toggle lever 59, the parts being in this position in the figure. The operator now places a toe tip properly between the jaws of the clamps, as shown at 100 in Fig. 2, making use of small gages 355', and steps upon a treadle, later to be described, to cause the lower end of an arm 357 to straighten the toggle. This causes the toe tip to be firmly gripped by the main jaws of the tip carrier and at the same time frees the extension 66 from the abutment block 355 whereupon the friction driving means starts the tip carrier upon another revolution about the spindle 23.

Referring still to Fig. 14, the abutment block 355 is fastened to an extension on the free end of a rigid arm 359, the other end of which is rigid with an upright standard 360 the base of which is fastened to the table of the loading station. The arm 357, rocking of which straightens the toggle of the clamp mechanism of the tip carrier, has a hub which is fast to the outer end of a rock-shaft 361 (see also Fig. 12) rotatably mounted in spaced bearings in the rigid horizontal arm 359. To the end of the rock-shaft 361, remote from the toggle-engaging arm 357, is fastened the hub of an arm 362, and to the free end of this arm is pivoted the upper end of a treadle-rod 363. The treadle-rod which is a two-part extensible one is normally held up in the position shown by a tension spring 364, the upper end of which is fastened to a depending lug on the under side of the table 343 and the lower end of which is fastened to the clamp 364ª (Fig. 1) which holds the two parts of the treadle-rod in adjusted position with respect to each other. The lower end of the treadle-rod is pivoted to a treadle 364ᵇ. A stop screw 365 (Fig. 14) limits upward movement of the treadle-rod; and a second stop screw 366, threaded through a lug on the arm 357, limits the extent to which the toggle-engaging arm 357 may be swung to straighten the toggle mechanism of the tip carrier.

The punching mechanism, except for the mechanism which imparts intermittent rotation to the gear 302 (Fig. 16) in timed relation to the intermittently operating punching tools, is or may be of any suitable type, for example that shown in the application referred to above, and will therefore not be described in any considerable detail. The punching tools comprise a die 401 carrying the usual hollow punches 402 and having the usual yielding perforated stripper plate 403, with which cooperates the usual platen 404, said platen being reciprocated to punch holes intermittently in the margin of a toe tip as said margin is fed intermittently over the stripper plate. The platen is fast to the lower end of a vertical bar 405 slidably mounted in the head of the machine. One link 406 of a toggle is pivoted at 407 to a collar which is fast to the bar, and the other link 408 is pivoted to the head at 409. The knuckle 410 of the toggle is pivotally connected by a short link 411 to a long link 413 which is pivoted at 415 to the stem of a yoke 416 pivoted about a stationary pivot 417 and oscillated about this pivot by a cam 418 on a counter-shaft 419, said counter-shaft having upon one end a large gear 420 which meshes with a worm on the main driving shaft 42. The link 413 has a guide slot 414 to receive a pin 421 carried by the frame. Thus oscillation of the yoke 416 imparts reciprocation to the platen 404.

As has been stated, the small gear 302, which engages the racks of the tip carriers and feeds the carriers past the punching mechanism, is driven by a larger gear 305. This larger gear (Fig. 16) has a depending stem 304 which is engaged by a one-way clutch, presently to be described, said clutch being carried by an oscillating casing 423. When this casing is oscillated, the gear 302, which feeds the carriers past the punching mechanism, is intermittently rotated in timed relation to the operation of the platen 404 so that the punching operations take place during the pauses in the intermittent feed movements of a tip. Pivoted at 424 to the top of the casing 423 is one end of a link 425, the other end of which is pivoted at 426 to a horizontal arm 427 (Fig. 15), the hub of which is fast to the lower end of a vertical rock-shaft 428. The hub of a second arm 429 has its outer end pivoted at 430 to the outer end of a toggle lever 431, which is connected to the outer end of the other lever 432 of the toggle by a knuckle or pivot 433, said lever 432 being pivoted at its inner end at 434 to a reciprocating yoke 435. This yoke has integral with it at opposite ends two guides 435ª, 435ᵇ, which are received in guideways in the frame, and is reciprocated by a cam 436 (Fig. 16) on the counter-shaft 419.

Returning now to Fig. 15, and assuming that the bodily movement of the knuckle 433 of the toggle is suitably controlled in a manner presently to be described, it will be seen that reciprocation of the yoke 435, through the toggle levers 432, 431, the arm 429, the vertical rock-shaft 428, the arm 427 and the long link 425 will oscillate the casing 423 (Fig. 16) and thereby impart intermittent rotation to the small gear 302 which feeds the tip carriers past the punching mechanism. The extent of the oscillations of the casing 423 determines the length of the intermittent feed movements imparted to the small gear 302 and by it to a tip carrier; and, in order to permit the extent of these movements to be varied, any suitable mechanism may be provided for controlling the bodily movement of the knuckle 433 of the toggle levers 431, 432. Such controlling mechanism is well-known and will be only briefly described, the present mechanism being substantially the same as that disclosed in United States Letters Patent No. 1,228,768, granted June 5, 1917, upon an application filed in the name of Perley R. Glass, and also disclosed in the prior application referred to above. This mechanism comprises a short link 437 pivoted at one end to the knuckle 433 and at the other end at 438 to a member 439 pivoted to the frame at 440 and having a handle which may be moved over a perforated plate 441 and held in adjusted angular position by pins placed in selected perforations. The knuckle 433 swings about the pivot 438; and, by swinging the handle of the member 439 to a new position and thereby corespondingly changing the location of the pivot 438, the path in which the knuckle 433 swings may be varied; and this will vary the extent of oscillation of the arm 429 and consequently the extent of the intermittent feed movements imparted to a tip carrier by the small gear 302.

It has been stated that rocking the casing 423 (Fig. 16) imparts intermittent rotation to the small gear 302. Referring now to Figs. 20 and 21, the construction by which this is accomplished will be described. The depending stem 304 of the large gear 305 is rotatably mounted in a bore in a depending lug of the gear casing 303, said depending lug being rotatably mounted in a vertical bearing 451 which is rigid with the frame of the punching mechanism. The stem of the gear 305 passes down through a bore in a member having a thick disk 452 which is the driven member of a one-way clutch, the driving member being the casing 423 which is oscillated, as has been described, by the link 425. The casing 423 is rotatably mounted upon the driven member 452; and below the casing 423 is a second casing 453 resting upon a lug 454 which is rigid with the frame of the punching mechanism. The casing 453 is stationary, being fastened to the lug 454 by a vertical screw 455 the lower part of which is located in a bore in the lug 454 and the upper part of which is threaded into the casing 453, there being a set screw 456 threaded through a portion of the lug 454 and bearing against the screw 455. The driven member 452 has in its periphery three cavities 456 each having two vertical walls at substantially right angles to each other. In the lower portion of each of these cavities is located a spring-pressed roll, one being shown at 457, which cooperates with the inner face of a wall of the lower stationary casing 453. In the upper portion of each of these cavities is located another roll, the three upper rolls being shown at 458. Each upper roll is engaged by a small spring-pressed plunger 459 which urges the roll into the narrowing space between one vertical wall 460 of the cavity and the inner face of the wall of the casing 423. The three lower rolls 457 are acted upon in the same manner by spring-pressed plungers (not shown) like the spring-pressed plungers 459. When now the casing 423, in its oscillation, rocks in the direction indicated by the arrow, the rolls 458 will clutch the driven member 452 to the casing 423 so that the shaft 304 of the gear 305 will be rotated. This gear meshes with a gear 461 the stem 462 of which is rotatable in a bearing rigid with the casing 303 and held from vertical movement by the gear 461 at the upper end of the stem and a collar 462' at the lower end. The gear 302, which engages the racks on the tip carriers, is fastened to an upward extension on the gear 461 by screws 463. Thus, when the casing 423 is moving in the direction indicated by the arrow, rotation is imparted to the small gear 302 in a direction to feed a tip carrier. When, however, the casing 423 is rocked in the direction opposite to that indicated by the arrow, the rolls 458 are no longer effective, and the driven member 452 remains stationary. On this reverse rocking movement of the casing 423 in a direction opposite to that indicated by the arrow, there may at times be a tendency to move the driven member 452 with it; and the purpose of the stationary casing 453 is to ensure that no such movement shall take place. Assuming that, upon rocking the casing 423 in the direction opposite to that indicated by the arrow, there is a tendency to move the member 452 with it, this member will be prevented from such movement by the lower three rolls 457 which will lock the member 452 to the stationary casing 453. There is thus provided a one-way clutch comprising the oscillating casing 423 and the three upper rolls 458, and a one-way lock comprising the lower stationary casing 453 and the three lower rolls 457, whereby oscillation of the casing 423 causes intermittent rotation of the small feeding gear 302 always in a forward direction.

Referring now to Fig. 2, the various mechanisms which have been described above are all mounted upon the base 27. The punching mechanism C may be adjusted along this base by turning a hand wheel 471 on a screw 472 which is held from longitudinal movement with respect to the base 27 of the apparatus and is threaded into the frame of the punching mechanism. The main driving shaft 42 is driven from an electric motor 473 through gearing contained in a casing 474. The friction driving mechanism for the tip carriers (Fig. 14) together with the table at the loading station A is adjustably fastened to the base 27 by headed bolts 475 which pass up through slots in the base and through lugs 26 on the boss 25 and have nuts 476 threaded on their upper ends.

Since the operation of the apparatus has been described in detail during the description given above of its various mechanisms, only a brief repetition will be appended. The operator stands at the loading station A (Fig. 2) having previously placed a stack of toe tip blanks with the bottom blank resting upon a support 501 the edges of the blanks being held in register by engagement with two rods 502. From this stack he takes a blank, places it in a tip carrier which has come to rest at that station with its jaws open and steps upon the treadle. This closes the jaws of the main clamp firmly upon the toe tip blank and releases the carrier to its friction driving means which then moves it to the skiving and shrinking station B. As the carrier approaches the skiving mechanism, the jaws of the auxiliary clamp are first pulled out so as to expose only a narrow extent of the toe tip blank. The carrier then moves between the first pair of rolls, the upper one of which rides upon the upper jaw 70 and closes it upon the blank. At the same time the small shaft 129 is rocked to close the mercury switch in the casing 253 whereby a heavy current passes through the shrinking tool to raise its temperature. The rack on the under side of the carrier is presently engaged by the gears in the gear casing 111, and fed past the skiving and shrinking mechanisms, the jaws of the auxiliary clamp being held firmly closed by the other two pairs of rolls between which they pass. At the end of the shrinking operation, the friction driving means moves the carrier to the punching mechanism. Here the cam 296 retracts the jaws of the auxiliary clamp, and the small gear in the casing 303 engages the rack on the tip carrier and feeds the carrier intermittently past the punching mechanism which forms an ornamental row of perforations along the rear edge of the tip. The friction driving means then moves the carrier first past the delivery station E, where the clamp is opened and the tip delivered into the receptacle 335, and then to the loading station A where the carrier comes to rest.

Although the invention has been set forth as embodied in a particular apparatus particularly adapted to finishing the edges of toe tips by a shrinking operation it should be understood that the invention is not limited in the scope of its application to the particular apparatus, to the particular finishing operation, or to operating upon the particular shoe part which have been shown and described.

Having described my invention, what I claim as new and desire to secure by Letters Patent of the United States is:

1. An apparatus of the class described having in combination, mechanism for operating upon shoe part blanks, a plurality of blank carriers movable to and past said mechanism, and impositive means for driving said carriers independently of one another.

2. An apparatus of the class described having, in combination, mechanism for operating upon shoe part blanks, a plurality of blank carriers movable in a closed path to and past said mechanism, and impositive means for driving said carriers independently of one another.

3. An apparatus of the class described having, in combination, mechanism for operating upon shoe part blanks, a plurality of blank carriers, a driving member for presenting the carriers to the mechanism, and friction means connecting each carrier independently of the others with the driving member whereby movement of one carrier may be retarded or caused to cease while the remaining carriers continue their movement.

4. An apparatus of the class described having, in combination, mechanism for operating upon shoe part blanks, a plurality of blank carriers, a driving member for moving the carriers in a closed path and presenting the carriers to the mechanism, and friction means connecting each carrier independently of the others with the driving member whereby movement of one carrier may be retarded or caused to cease while the remaining carriers continue their movement.

5. An apparatus of the class described having, in combination, mechanism for operating upon shoe part blanks, a plurality of blank carriers movable to and past said mechanism, a rotating shaft, a plurality of hubs each rigid with a carrier rotatably mounted on the shaft, and a plurality of driving members rotated by the shaft, each driving member being in frictional contact with one of the hubs.

6. An apparatus of the class described having, in combination, mechanism for operating upon shoe part blanks, a plurality of blank carriers movable in a closed path to and past said mechanism, a rotating shaft, a plurality of hubs each rigid with a carrier rotatably mounted on the shaft, and a plurality of driving members rotated by the shaft, each driving member being in frictional contact with one of the hubs.

7. An apparatus of the class described having, in combination, mechanism for operating upon shoe part blanks, a plurality of blank carriers movable to and past said mechanism, a rotating shaft, a plurality of hubs each rigid with a carrier rotatably mounted on the shaft, and a plurality of driving members slidably keyed to the shaft, each driving member having a portion which frictionally engages a hub.

8. An apparatus of the class described having, in combination, mechanism for operating upon shoe part blanks, a plurality of blank carriers movable to and past said mechanism, a rotating shaft, a plurality of hubs each rigid with a carrier rotatably mounted on the shaft, a plurality of driving members slidably keyed to the shaft, each driving member having a portion which frictionally engages a hub, and yielding means for holding the driving members and the hubs in engagement.

9. An apparatus of the class described having, in combination, mechanism for operating upon shoe part blanks, a plurality of blank carriers movable to and past said mechanism, a rotating shaft, a plurality of hubs each rigid with a carrier rotatably mounted on the shaft, washers of friction material forming respectively the upper and the lower portion of each hub, and a plurality of driving members slidably keyed to the shaft, each driving member having a portion which contacts with a friction washer.

10. An apparatus of the class described having, in combination, mechanism for operating upon shoe part blanks, a plurality of blank carriers movable to and past said mechanism, a rotating shaft, a plurality of hubs each rigid with a carrier rotatably mounted on the shaft, washers of frictional material forming respectively the upper and the lower portion of each hub, a plurality of driving members slidably keyed to the shaft, each driving member having a portion which contacts with a friction washer, and yielding means for holding the driving members and washers in contact.

11. An apparatus of the class described having, in combination, mechanism for operating upon toe tips, a plurality of carriers including clamps adapted to expose the rear margins of the tips to the action of the operating mechanism, a continuously driven shaft, a plurality of hubs each rigid with a carrier rotatably mounted upon the shaft, and a plurality of driving members rotated by the shaft, each member being in frictional driving contact with one of the hubs.

12. An apparatus of the class described having, in combination, mechanism for operating upon shoe part blanks, a plurality of blank carriers movable to and past said mechanism, friction means for moving said carriers independently of one another at a given speed to present them to the operating mechanism, and feeding means associated with said mechanism for engaging the carriers one by one and feeding them past the operating mechanism at a different speed.

13. An apparatus of the class described having, in combination, mechanism for operating upon shoe part blanks, a plurality of blank carriers movable to and past said mechanism, friction means for moving said carriers independently of one another at a given speed to present them to the operating mechanism, and feeding means associated with said mechanism for engaging the carriers one by one and feeding them past the operating mechanism at a slower speed.

14. An apparatus of the class described having, in combination, mechanism for operating upon shoe part blanks, a plurality of blank carriers movable to and past said mechanism, friction means for moving said carriers independently of one another at a given speed to present them to the operating mechanism, and feeding means associated with said mechanism for engaging the carriers one by one and feeding them past the operating mechanism at a different speed, the friction driving means for each carrier being ineffective while the blank held by that carrier is being operated upon.

15. An apparatus of the class described having, in combination, shrinking mechanism and punching mechanism for operating upon toe tip blanks, a plurality of blank carriers movable to and past said mechanisms, and friction means for driving said carriers independently of one another to present toe tip blanks in succession to said mechanisms.

16. An apparatus of the class described having, in combination, shrinking mechanism for operating upon the edges of toe tip blanks, a plurality of blank carriers including clamps for holding toe tips with their rear margins exposed, said carriers being mounted for movement in a closed path, friction means for moving said carriers independently of each other at a given speed toward said shrinking mechanism, and feeding means associated with said mechanism for engaging the carriers one by one and feeding them past said mechanism at a different speed from that at which the friction means drives them.

17. An apparatus of the class described having, in combination, mechanism for operating upon shoe part blanks, a loading station, a carrier including a clamp movable in a closed path from the loading station past the operating mechanism back to the loading station, means for opening the clamp before the carrier returns to the loading station and for arresting the carrier with the clamp open at the loading station, and operator-controlled means at the loading station for closing the clamp and for freeing the carrier.

18. An apparatus of the class described having, in combination, mechanism for operating upon shoe part blanks, a loading station, a carrier for a blank including a clamp and a member movable into one position to close the clamp upon the blank and into another position to open the clamp, means for moving the carrier from the loading station in a closed path past the operating mechanism with the clamp closed and for thereafter moving the member into a position to open the clamp, and an abutment at the loading station normally held in the path of movement of the carrier and arranged to contact with the member and arrest the carrier with the clamp open.

19. An apparatus of the class described having, in combination, mechanism for operating upon shoe part blanks, a loading station, a carrier for a blank including a clamp and a member movable into one position to close the clamp upon the blank and into another position to open the clamp, means for moving the carrier from the loading station in a closed path past the operating mechanism with the clamp closed and for thereafter moving the member into a position to open the clamp, an abutment at the loading station arranged to contact with the member and arrest the carrier with the clamp open, and operator-controlled means for moving the member into a position to close the clamp and at the same time to disengage it from the abutment.

20. An apparatus of the class described having, in combination, mechanism for operating upon shoe part blanks, a loading station, a carrier movable in a closed path from the loading station past the operating mechanism and back to the loading station, said carrier including a clamp, toggle mechanism for opening and closing the clamp, means for operating the toggle mechanism to open the clamp before the carrier returns to the loading station, and an abutment at the loading station arranged to engage a member of the toggle mechanism to arrest the carrier with the clamp open.

21. An apparatus of the class described having, in combination, mechanism for operating upon shoe part blanks, a loading station, a carrier movable in a closed path from the loading station past the operating mechanism and back to the loading station, said carrier including a clamp, toggle mechanism for opening and closing the clamp, means for operating the toggle mechanism to open the clamp before the carrier returns to the loading station, an abutment at the loading station arranged to engage a member of the toggle mechanism to arrest the carrier with the clamp open, and operator-controlled means for moving the toggle mechanism to close the clamp and for disengaging it from the abutment.

22. An apparatus of the class described having, in combination, shrinking mechanism and punching mechanism for operating upon the margin along selected edges of flexible shoe part blanks, a loading station, a carrier including a clamp for engaging the blank, means for moving the carrier in a closed path from the loading station past the shrinking and the punching mechanisms and back to the loading station, and means for opening the clamp before the carrier returns to the loading station.

23. An apparatus of the class described having, in combination, shrinking mechanism and punching mechanism for operating upon the margin along selected edges of flexible shoe part blanks, a loading station, a carrier including a clamp for engaging the blank, means for moving the carrier in a closed path from the loading station past the shrinking and the punching mechanisms and back to the loading station, and means for opening the clamp before the carrier returns to the loading station and for arresting the carrier with the clamp open at the loading station.

24. An apparatus of the class described having, in combination, shrinking mechanism for operating upon the margin along the rear edge of a toe tip blank, a loading station, a carrier including a clamp for engaging the blank with its rear margin exposed, means for moving the carrier in a closed path from the loading station past the shrinking mechanism and back to the loading station, and means for arresting the carrier at the loading station with the clamp open.

25. An apparatus of the class described having, in combination, mechanism for operating upon toe tips, a loading station, a delivery station, a carrier for the tip including a clamp for engaging the tip so as to leave the rear margin thereof exposed to be operated upon, means for moving the carrier in a closed path from the loading station past the operating mechanism and the delivery station back to the loading station, means for opening the clamp at the delivery station, and means normally held in the path of movement of the carrier for arresting the carrier with the clamp open at the loading station.

26. An apparatus of the class described having, in combination, mechanism for operating upon toe tips, a loading station, a delivery station, a carrier for the tip including a clamp for engaging the tip so as to leave the rear margin thereof exposed to be operated upon, means for moving the carrier in a closed path from the loading station past the operating mechanism and the delivery station back to the loading station, means for opening the clamp at the delivery station, means for removing the shoe tip from the carrier, and means for arresting the carrier with the clamp open at the loading station.

27. An apparatus of the class described having, in combination, shrinking mechanism and punching mechanism for operating successively upon toe tips, carriers for the tips each including a clamp, a loading station where the tips are placed in the carriers and clamped in position, means for moving the carriers in succession past the shrinking mechanism and the punching mechanism back to the loading station, and means located between the punching mechanism and the loading station for opening the clamps and removing the tips from the carriers.

28. An apparatus of the class described having, in combination, mechanism for operating upon toe tip blanks, blank carriers movable in a closed path past said mechanism, a vertical driving shaft, a plurality of arms extending radially from said shaft and driven thereby, and means for mounting a carrier for vertical adjustment upon the outer end of each arm.

29. An apparatus of the class described having, in combination, mechanism for operating upon toe tip blanks, blank carriers movable in a closed path past said mechanism, a vertical driving shaft, a plurality of arms extending radially from said shaft and driven thereby independently of one another, and means for mounting a carrier for vertical adjustment upon the outer end of each arm.

30. An apparatus of the class described having, in combination, mechanism for operating upon shoe part blanks, a plurality of blank carriers movable to and past said mechanism, driving means for presenting the carriers to the mechanism, racks on said carriers having their ends constructed to permit them to overlap, and feeding means associated with the mechanism for engaging the racks and feeding the carriers past the mechanism.

31. An apparatus of the class described having, in combination, mechanism for operating upon shoe part blanks, a plurality of blank carriers each having a rack, and a rotating gear associated with the operating mechanism adapted to engage the racks and feed the carriers past the operating mechanism, the adjacent ends of the racks of adjacent carriers being formed to permit said ends to overlap.

32. An apparatus of the class described having, in combination, mechanism for operating upon shoe part blanks, a plurality of blank carriers each having a rack, and a rotating gear associated with the operating mechanism adapted to engage the racks and feed the carriers past the operating mechanism, the adjacent ends of the racks of adjacent carriers being cut away to permit the carriers to overlap whereby the gear may engage a portion of two racks at the same time.

33. An apparatus of the class described having, in combination, mechanism for operating upon shoe part blanks, a plurality of blank carriers movable in a circular path to and past said mechanism, a segmental rack on each carrier the ends of which project beyond the edges of the carrier in the path of movement of the carrier, and a rotating gear associated with the operating mechanism for engaging the racks, the projecting portions of said racks being formed to permit them to overlap.

34. A shoe part carrier for an apparatus of the class described adapted to be moved to present shoe parts to a mechanism for operating upon said parts, said carrier having, in combination, a main clamp and an auxiliary clamp each comprising an upper pivoted jaw, yielding means acting directly upon the pivoted jaw of the auxiliary clamp to urge said jaw to swing upwardly, connections between the two pivoted jaws whereby the pivoted jaw of the main clamp is also urged to swing upwardly, and toggle mechanism including a compression spring located between the knuckle of the toggle and the pivoted jaw of the main clamp for swinging the pivoted jaw of the main clamp, and with it the pivoted jaw of the auxiliary clamp, downwardly.

35. An apparatus of the class described having, in combination, mechanism for operating upon shoe part blanks, a carrier movable to and past said mechanism, said carrier including a clamp for holding the shoe part, means for opening the clamp after the shoe part has been operated upon, a finger for engaging the shoe part and preventing its further movement with the moving carrier, and a member on the carrier which cooperates with the finger in expelling the shoe part from the carrier.

36. An apparatus of the class described having, in combination, shrinking mechanism for operating upon the edges of toe tips, a tip carrier adapted to hold a toe tip, means for moving the carrier to and past the shrinking mechanism, means for thereafter releasing the tip, and means including a stationary finger and an abutment on the moving carrier for removing the tip from the carrier.

37. An apparatus of the class described having, in combination, mechanism for operating upon shoe part blanks, a plurality of blank carriers movable in a closed path to present blanks in succession to said mechanism, and means operated by a leading carrier as it moves away from said mechanism for arresting a following carrier before it reaches the mechanism, said means comprising a controller pivoted about an axis which is substantially parallel to the plane of the path of the carriers, and members depending from the carriers, and adapted to ride over the controller and tilt it about its pivot.

38. An apparatus of the class described having, in combination, mechanism for operating upon shoe part blanks, a plurality of blank carriers movable to present blanks in succession to said mechanism, a segmental controller pivoted about a horizontal axis, the carriers being movable over the controller, and yielding means for normally holding the controller tilted, with one end extending above and the other below its pivot, whereby a leading carrier as it rides over the controller swings the upwardly swung end of the controller down, thereby swinging the other end up into position to engage and bring to rest a following carrier.

39. An apparatus of the class described having, in combination, mechanism for operating upon shoe part blanks, an upright post, a plurality of blank carriers, a plurality of arms to the outer ends of which the carriers are fastened, hubs at the inner ends of the arms mounted for rotation about the axis of the post, an indicator carried at the top of the post, and means connected to one of the arms for operating the indicator.

40. An apparatus of the class described having, in combination, mechanism operating intermittently to punch ornamental holes along the edges of toe tip blanks, a plurality of blank carriers, means for moving the carriers to present them in succession to the punching mechanism, and means for engaging the carriers one by one and feeding them intermittently past said mechanism, said last-named means including a positively operating one-way clutch for moving the engaging and feeding means in a forward direction and a positively operating one-way lock to prevent movement in a rearward direction.

41. An apparatus of the class described having, in combination, mechanism operating intermittently to punch ornamental holes along the edges of toe tip blanks, a plurality of blank carriers, means for moving the carriers to present them in succession to the punching mechanism, means for engaging the carriers one by one and feeding them intermittently past said mechanism, said last-named means including a driven member connected with said means and provided with cavities each deeper at one end than at the other, rolling members in said cavities, a casing surrounding said driven member and engaging said rolling members, and means for oscillating said casing.

42. An apparatus of the class described having, in combination, mechanism operating intermittently to punch ornamental holes along the edges of toe tip blanks, a plurality of blank carriers, friction means for moving the carriers independently of one another to present them in succession to the punching mechanism, each carrier having a member adapted to be engaged positively to feed the carrier intermittently past the punching mechanism, a member associated with the punching mechanism for so engaging the member on the carrier, and means for operating said last-named member intermittently, said means comprising a positively operating one-way clutch for moving said last-named member in a forward direction, and a one-way lock for preventing movement of said last-named member in the opposite direction.

43. An apparatus of the class described having, in combination, skiving mechanism including a stationary shear member and an oscillating shear member, shrinking mechanism including a plow and a heated shrinking tool, a plurality of toe tip carriers movable in a circular path toward and past said mechanisms, said skiving mechanism being located to remove a narrow skiving from the edge of each toe tip, and means for adjusting the shrinking mechanism toward and from the center of curvature of the path of the carriers to vary the extent of the skived edges of the tips which is engaged and operated upon by the shrinking mechanism.

44. An apparatus of the class described having, in combination, shrinking mechanism including a shrinking tool adapted to shrink the edges of leather shoe parts and a hammer for operating upon said edges, a pivot upon which the hammer is mounted, a lever pivoted to the frame of the machine by which lever the pivot for the hammer is carried, yielding means for holding the lever normally in a given angular position, and a connecting rod pivoted to the tail of the hammer.

45. An apparatus of the class described having, in combination, mechanism for operating upon toe tips, a plurality of carriers including clamps adapted to expose the rear margins of the tips to the action of the operating mechanism, friction means for moving the carriers independently of one another at a given speed to present them in succession to the operating mechanism, and feeding means associated with said mechanism for engaging the carriers one by one and feeding them past the operating mechanism at a different speed.

46. An apparatus of the class described having, in combination, mechanism for operating upon shoe part blanks, a loading station, a carrier including a clamp movable in a closed path from the loading station past the operating mechanism to the loading station, friction driving means acting at all times to urge the carrier to move in said path, and means for arresting the carrier at the loading station and for holding it there in opposition to the force of the friction driving means.

47. An apparatus of the class described having, in combination, mechanism for operating upon shoe part blanks, a loading station, a carrier including a clamp movable in a closed path from the loading station past the operating mechanism to the loading station, friction driving means acting at all times to urge the carrier to move in said path, means for opening the clamp, and means for arresting the carrier with the clamp open at the loading station and for holding it there in opposition to the force of the friction driving means.

48. An apparatus of the class described having, in combination, shrinking mechanism for operating upon a shoe part blank, a loading station, a carrier including a clamp for engaging a blank, said carrier being movable in a closed path from the loading station past the shrinking mechanism back to the loading station, friction driving means acting at all times to urge the carrier to move in said path, and means for arresting the carrier at the loading station and holding it there in opposition to the force of the friction driving means.

49. An apparatus of the class described having, in combination, shrinking mechanism for operating upon a shoe part blank, a loading station, a carrier including a clamp for engaging a blank, said carrier being movable in a closed path from the loading station past the shrinking mechanism back to the loading station, friction driving means acting at all times to urge the carrier to move in said path, means for opening the clamp, and means for arresting the carrier with the clamp open at the loading station and holding it there in opposition to the force of the friction driving means.

50. An apparatus of the class described having, in combination, mechanisms for finishing the edge and for forming a row of perforations along the finished edge of a blank of upper leather, a loading station, a delivery station, a carrier including a clamp which grips the blank in such manner as to leave the margin of the blank exposed for the edge finishing and perforating operations, means for moving the carrier in a closed path from the loading station past the edge finishing and perforating mechanisms and the delivery station back to the loading station, means for opening the clamp and removing the finished blank from the carrier at the loading station, and means for arresting the carrier with the clamp open at the loading station.

51. An apparatus of the class described having, in combination, edge finishing mechanism and punching mechanism for operating upon shoe part blanks, a plurality of blank carriers movable to and past said mechanisms, and friction means for driving said carriers independently of one another to present blanks in succession to said mechanisms.

JOHN B. COFFEY.